United States Patent [19]
Magee

[11] 3,932,471

[45] Jan. 13, 1976

[54] AZIDE

[75] Inventor: Thomas A. Magee, Mentor, Ohio

[73] Assignee: Diamond Shamrock Corporation, Cleveland, Ohio

[22] Filed: Aug. 24, 1973

[21] Appl. No.: 391,329

Related U.S. Application Data

[60] Division of Ser. No. 229,207, Feb. 24, 1972, Pat. No. 3,875,232, which is a continuation-in-part of Ser. No. 132,584, April 8, 1971, abandoned.

[52] U.S. Cl............. 260/349; 260/471 C; 260/470; 260/481 R; 260/482 C; 424/226; 424/300
[51] Int. Cl.²...................................... C07C 117/00

[58] Field of Search..................................... 260/349

[56] References Cited
UNITED STATES PATENTS

| | | | |
|---|---|---|---|
| 3,839,395 | 10/1974 | Otsuka et al......................... | 260/349 |
| 3,875,232 | 4/1975 | Magee ................................ | 260/349 |

*Primary Examiner*—John M. Ford
*Attorney, Agent, or Firm*—Leslie G. Nunn; John C. Tiernan

[57] ABSTRACT

Carbamate derivatives of ketoximes are useful in combatting pests such as insects, mites, and nematodes.

2 Claims, No Drawings

AZIDE

CROSS REFERENCE TO RELATED APPLICATION

This application is a division of application Ser. No. 229,207 filed Feb. 24, 1972, now U.S. Pat. No. 3,875,232, issued Apr. 1, 1975, said application Ser. No. 229,207 being a continuation-in-part of application Ser. No. 132,584 filed Apr. 8, 1971, now abandoned.

BACKGROUND OF THE INVENTION

1. Field of the Invention

This invention relates to organic compounds useful as pesticides and more particularly to carbamate derivatives of ketoximes having insecticidal, miticidal, and, in some cases, nematocidal activity comparable or superior to the most closely related commercial products while having significantly lower toxicity toward mammals than these commercial products.

2. Description of the Prior Art

The outstanding pesticidal activity of the carbamate derivatives of the ketoximes disclosed in this invention is surprising and unexpected because the prior art indicates that carbamate derivatives only of substituted aldoximes have high pesticidal activity, whereas ketoxime derivatives were essentially inactive. For example, U.S. Pat. No. 3,217,037 and U.S. Pat. No. 3,507,965 show compounds, possessing pesticidal activity, of the structure:

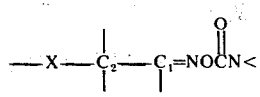

wherein $X = O$ or $S(O)_n$ when $n = 0, 1,$ or 2 and the free valences are satisfied by hydrogen or hydrocarbyl radicals. In these two patents, the preferred compounds are aldoximes wherein the carbon atom ($C_1$) attached to the oxime moiety in the above structure is substituted with hydrogen. In the J. Agr. Food Chem., 14, 356 (1966), the patentees of these patents state, "The data . . . demonstrate . . . the detrimental effect . . . of replacing the aldehydic hydrogen with an alkyl group. All of the ketoxime derivatives . . . were virtually inactive when compared with the aldoxime derivative . . . ." Ketoxime compounds of Formulas (I) and (II) below are reported in the reference as being essentially inactive compared to the aldoxime compound of Formula (III) below which is known commercially as aldicarb (Temik). The compound of Formula (II) differs from the compound of Formula (III) only in that a methyl group has been substituted for the aldehydic hydrogen of Formula (III).

been found to possess high pesticidal activity, comparable or superior to that of the compound of Formula (III).

SUMMARY OF THE INVENTION

The carbamates of ketoximes of the present invention can be represented by the formula:

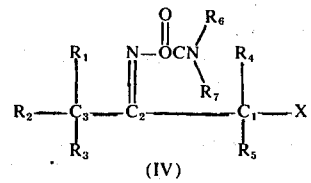

where:
- $R_1 = R_2-R_4$ or X;
- $R_2-R_4$ = hydrogen, lower alkyl, lower alkenyl, lower alkynyl, substituted lower alkyl, alkenyl, or alkynyl with the proviso that $R_2$ and $R_3$ may be connected to form a cycloaliphatic ring;
- $R_5 = R_2-R_4$ or X with the proviso that when $R_5$ and X are $OR_8$, $SR_8$, $S(O)R_8$, $SO_2R_8$, or $NR_8R_9$, $R_5$ and X may be connected to form a heterocyclic ring;
- $R_6-R_7$ = hydrogen, lower alkyl, lower alkenyl, or lower alkynyl;
- $X = SR_8$, $S(O)R_8$, $SO_2R_8$, $OR_8$, $OSO_2R_8$, $NR_8R_9$, $NO_2$, CN, SCN, $N_3$, or halogen;
- $R_8$ = hydrogen, lower alkyl, lower alkenyl, lower alkynyl, aryl, substituted aryl, carbamyl, substituted carbamyl, acyl, or substituted acyl with the proviso that the lower alkyl or alkenyl groups may be further substituted with X; and
- $R_9$ = hydrogen or lower alkyl with the proviso that $R_8$, $R_9$ and N in the $NR_8R_9$ group may form a heterocyclic ring.

The term lower alkyl radical means a radical having from one to about seven carbon atoms.

This invention specifically includes those carbamates of Formula (IV) where $R_2$ and $R_3$ are lower alkyl radicals such as methyl; $R_1$ is either $R_2$ or X; $R_4$ and $R_5$ are hydrogen; X is $-S(O)_nR_8$ where $n = 0, 1,$ or 2; $R_8$ is a lower alkyl radical such as methyl; and $R_7$ and $R_8$ are individually hydrogen, a lower alkyl radical such as methyl or a lower alkenyl radical.

It is completely unexpected to discover that carbamate derivatives of ketoximes such as the carbamate of Formula (V) have pesticidal activity comparable to that of the carbamate derivative of the aldoxime of Formula (III):

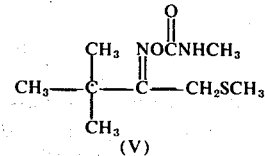

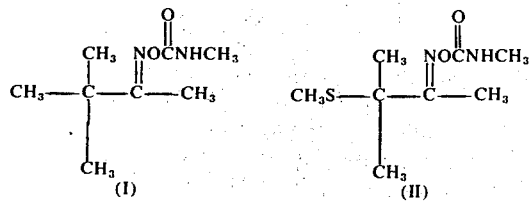

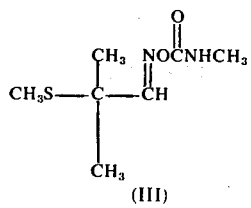

The ketoxime derivatives of Formulas (I) and (II) have been resynthesized and tested and their reported lack of activity relative to that of the compound of Formula (III) reconfirmed. Surprisingly, however, the ketoxime derivatives of the present invention have and simultaneously exhibit significantly lower toxicity toward mammals than does the compound of Formula (III). Thus, the oral toxicity of the compound of Formula (V), measured on albino rats and expressed as the $LD_{50}$, was found to be 8.5 mgm/kg of body weight; the dermal toxicity, measured on albino rabbits, again expressed as the $LD_{50}$, was 38.9 mgm/kg of body weight. $LD_{50}$ is a standard means of expressing toxicity and indicates the concentration required to kill 50 percent of the test animals. In each case, the $LD_{50}$ value is approximately eight times greater than the reported value for the carbamate derivative of the aldoxime compound of Formula (III).

It is an object of this invention to provide carbamates of substituted ketoximes, which are useful pesticides. A further object is to provide a method for producing these carbamates. Another object is to provide pesticidal compositions containing these carbamates. Still another object is to provide methods for combatting pests such as insects, mites, and nematodes using these carbamates.

It is intended, however, that the detailed description and specific examples given herein do not limit this invention but merely indicate preferred embodiments thereof since various changes and modifications within the scope of this invention will become apparent to those skilled in the art.

DESCRIPTION OF THE PREFERRED EMBODIMENTS

Preferred compounds of Formula (IV) include carbamate derivatives of 1-hydrocarbylthio(or 1-azido)-2-alkanone oximes wherein the carbamate nitrogen can be substituted with zero, one, or two lower alkyl groups; the carbon atom ($C_1$) substituted by the hydrocarbylthio(or azido) group is not further substituted; and the carbon atom ($C_3$) not substituted by the hydrocarbylthio(or azido) groups is preferably substituted with an alkyl group and is optimally completely alkylated to provide a maximum degree of branching on this carbon atom.

A second preferred group of Formula (IV) compounds include carbamate derivatives of 1-hydrocarbylthio(or 1-azido)-2-alkanone oximes wherein the carbamate nitrogen can be substituted with zero, one, or two lower alkyl groups; the carbon atom ($C_1$) substituted by the hydrocarbylthio(or azido) group is not further substituted; and the carbon atom ($C_3$) is preferably substituted with a substituent of group X and is optimally further completely alkylated to provide a maximum degree of branching on this carbon atom.

These compounds exhibit extremely high activity as insecticides and miticides, both as contact and as systemic toxicants. In some cases, they show high nematocidal activity.

As specific examples of these compounds, there may be mentioned 1-hydrocarbylthio-3,3-dimethyl-2-methylcarbamyloximinobutanes such as:

1-methylthio-3,3-dimethyl-2-methylcarbamyloximinobutane;
1-ethylthio-3,3-dimethyl-2-methylcarbamyloximinobutane;
1-n-propylthio-3,3-dimethyl-2-methylcarbamyloximinobutane;
1-isopropylthio-3,3-dimethyl-2-methylcarbamyloximinobutane;
1-n-butylthio-3,3-dimethyl-2-methylcarbamyloximinobutane;
1-tert.-butylthio-3,3-dimethyl-2-methylcarbamyloximinobutane;
1-sec.-butylthio-3,3-dimethyl-2-methylcarbamyloximinobutane;
1-isobutylthio-3,3-dimethyl-2-methylcarbamyloximinobutane;
1-vinylthio-3,3-dimethyl-2-methylcarbamyloximinobutane;
1-(2-propenylthio)-3,3-dimethyl-2-methylcarbamyloximinobutane;
1-(3-butenylthio)-3,3-dimethyl-2-methylcarbamyloximinobutane;
1-ethynylthio-3,3-dimethyl-2-methylcarbamyloximinobutane;
1-phenylthio-3,3-dimethyl-2-methylcarbamyloximinobutane;
1-benzylthio-3,3-dimethyl-2-methylcarbamyloximinobutane; and the like;

also the analogous 1-hydrocarbylthio-3-methyl-2-methylcarbamyloximinobutanes such as:

1-methylthio-3-methyl-2-methylcarbamyloximinobutane;
1-ethylthio-3-methyl-2-methylcarbamyloximinobutane;
1-n-propylthio-3-methyl-2-methylcarbamyloximinobutane;
1-isopropylthio-3-methyl-2-methylcarbamyloximinobutane;
1-n-butylthio-3-methyl-2-methylcarbamyloximinobutane;
1-tert.-butylthio-3-methyl-2-methylcarbamyloximinobutane;
1-sec.-butylthio-3-methyl-2-methylcarbamyloximinobutane;
1-isobutylthio-3-methyl-2-methylcarbamyloximinobutane;
1-vinylthio-3-methyl-2-methylcarbamyloximinobutane;
1-(2-propenylthio)-3-methyl-2-methylcarbamyloximinobutane;
1-(3-butenylthio)-3-methyl-2-methylcarbamyloximinobutane;
1-ethynylthio-3-methyl-2-methylcarbamyloximinobutane;
1-phenylthio-3-methyl-2-methylcarbamyloximinobutane;
1-benzylthio-3-methyl-2-methylcarbamyloximinobutane; and the like;

as well as analogous 1-hydrocarbylthio-2-methylcarbamyloximinobutanes such as:
1-methylthio-2-methylcarbamyloximinobutane;
1-ethylthio-2-methylcarbamyloximinobutane;
1-n-propylthio-2-methylcarbamyloximinobutane;
1-isopropylthio-2-methylcarbamyloximinobutane;
1-n-butylthio-2-methylcarbamyloximinobutane;
1-tert.-butylthio-2-methylcarbamyloximinobutane;
1-sec.-butylthio-2-methylcarbamyloximinobutane;
1-isobutylthio-2-methylcarbamyloximinobutane;
1-vinylthio-2-methylcarbamyloximinobutane;
1-(2-propenylthio)-2-methylcarbamyloximinobutane;
1-(3-butenylthio)-2-methylcarbamyloximinobutane;
1-ethynylthio-2-methylcarbamyloximinobutane;
1-phenylthio-2-methylcarbamyloximinobutane;
1-benzylthio-2-methylcarbamyloximinobutane; and the like;

as well as analogous 1-hydrocarbylthio-2-methylcarbamyloximinopropanes such as:

1-methylthio-2-methylcarbamyloximinopropane;
1-ethylthio-2-methylcarbamyloximinopropane;

1-n-propylthio-2-methylcarbamyloximinopropane;
1-isopropylthio-2-methylcarbamyloximinopropane;
1-n-butylthio-2-methylcarbamyloximinopropane;
1-tert.-butylthio-2-methylcarbamyloximinopropane;
1-sec.-butylthio-2-methylcarbamyloximinopropane;
1-isobutylthio-2-methylcarbamyloximinopropane;
1-vinylthio-2-methylcarbamyloximinopropane;
1-(2-propenylthio)-2-methylcarbamyloximinopropane;
1-(3-butenylthio)-2-methylcarbamyloximinopropane;
1-ethynylthio-2-methylcarbamyloximinopropane;
1-phenylthio-2-methylcarbamyloximinopropane;
1-benzylthio-2-methylcarbamyloximinopropane; and the like;

as well as carbamates of oximes of other straight or branched methyl-alkyl ketones where the methyl group is substituted with a hydrocarbylthio group such as:

1-methylthio-2-methylcarbamyloximinopentane;
1-methylthio-2-methylcarbamyloximinohexane;
1-methylthio-4,4-dimethyl-2-methylcarbamyloximinopentane;
1-methylthio-3,3-dimethyl-2-methylcarbamyloximinopentane;
1-methylthio-3,3-dimethyl-2-methylcarbamyloximinohexane; and the like.

Further examples of these compounds include those wherein the sulfide linkage of the above compounds is replaced by an oxide linkage, a sulfinyl linkage or a sulfonyl linkage as, for example:

1-methoxy-3,3-dimethyl-2-methylcarbamyloximinobutane;
1-ethoxy-3,3-dimethyl-2-methylcarbamyloximinobutane;
1-(2-propenyloxy)-3,3-dimethyl-2-methylcarbamyloximinobutane;
1-methoxy-3-methyl-2-methylcarbamyloximinobutane;
1-ethoxy-3-methyl-2-methylcarbamyloximinobutane;
1-(2-propenyloxy)-3-methyl-2-methylcarbamyloximinobutane;
1-methoxy-2-methylcarbamyloximinobutane;
1-ethoxy-2-methylcarbamyloximinobutane;
1-(2-propenyloxy)-2-methylcarbamyloximinobutane;
1-methoxy-2-methylcarbamyloximinopropane;
1-ethoxy-2-methylcarbamyloximinopropane;
1-(2-propenyloxy)-2-methylcarbamyloximinopropane;

and:

1-methylsulfinyl-3,3-dimethyl-2-methylcarbamyloximinobutane;
1-ethylsulfinyl-3,3-dimethyl-2-methylcarbamyloximinobutane;
1-(2-propenylsulfinyl)-3,3-dimethyl-2-methylcarbamyloximinobutane;
1-methylsulfinyl-3-methyl-2-methylcarbamyloximinobutane;
1-ethylsulfinyl-3-methyl-2-methylcarbamyloximinobutane;
1-(2-propenylsulfinyl)-3-methyl-2-methylcarbamyloximinobutane;
1-methylsulfinyl-2-methylcarbamyloximinobutane;
1-ethylsulfinyl-2-methylcarbamyloximinobutane;
1-(2-propenylsulfinyl)-2-methylcarbamyloximinobutane;
1-methylsulfinyl-2-methylcarbamyloximinopropane;
1-ethylsulfinyl-2-methylcarbamyloximinopropane;
1-(2-propenylsulfinyl)-2-methylcarbamyloximinopropane;

and:

1-methylsulfonyl-3,3-dimethyl-2-methylcarbamyloximinobutane;
1-ethylsulfonyl-3,3-dimethyl-2-methylcarbamyloximinobutane;
1-(2-propenylsulfonyl)-3,3-dimethyl-2-methylcarbamyloximinobutane;
1-methylsulfonyl-3-methyl-2-methylcarbamyloximinobutane;
1-ethylsulfonyl-3-methyl-2-methylcarbamyloximinobutane;
1-(2-propenylsulfonyl)-3-methyl-2-methylcarbamyloximinobutane;
1-methylsulfonyl-2-methylcarbamyloximinobutane;
1-ethylsulfonyl-2-methylcarbamyloximinobutane;
1-(2-propenylsulfonyl)-2-methylcarbamyloximinobutane;
1-methylsulfonyl-2-methylcarbamyloximinopropane;
1-ethylsulfonyl-2-methylcarbamyloximinopropane;
1-(2-propenylsulfonyl)-2-methylcarbamyloximinopropane; and the like.

Further examples of these compounds include those wherein X is $N_3$.

1-azido-2-methylcarbamyloximinopropane;
1-azido-2-methylcarbamyloximinobutane;
1-azido-2-methylcarbamyloximinopentane;
1-azido-3-methyl-2-methylcarbamyloximinobutane;
1-azido-3-methyl-2-methylcarbamyloximinopentane;
1-azido-4-methyl-2-methylcarbamyloximinopentane;
1-azido-3,3-dimethyl-2-methylcarbamyloximinobutane;
1-azido-3,3-dimethyl-2-methylcarbamyloximinopentane;
1-azido-3,3-dimethyl-2-methylcarbamyloximinohexane;
1-azido-4,4-dimethyl-2-methylcarbamyloximinopentane; and the like.

Additional examples of these compounds include those wherein two members of the group $R_1$, $R_2$ and $R_3$ are joined together to form a ring as, for example:

1-cyclopropyl-1-methylcarbamyloximino-2-methylthioethane;
1-methylcarbamyloximino-1-(1-methylcyclopropyl)-2-methylthioethane;
2-azido-1-methylcarbamyloximino-1-(1-methylcyclopropyl)ethane;
1-cyclobutyl-1-methylcarbamyloximino-2-methylthioethane;
1-methylcarbamyloximino-1-(1-methylcyclobutyl)-2-methylthioethane;
2-azido-1-methylcarbamyloximino-1-(1-methylcyclobutyl)ethane;
1-cyclopentyl-1-methylcarbamyloximino-2-methylthioethane;
1-methylcarbamyloximino-1-(1-methylcyclopentyl)-2-methylthioethane;
1-cyclohexyl-1-methylcarbamyloximino-2-methylthioethane;
1-methylcarbamyloximino-1-(1-methylcyclohexyl)-2-methylthioethane;

2-azido-1-methylcarbamyloximino-1-(1-methylcyclohexyl)ethane; and the like;

as well as compounds wherein $R_1$ is X as, for example:

1,3-bis(methylthio)-3-methyl-2-methylcarbamyloximinobutane;
3-methyl-2-methylcarbamyloximino-1-methylthio-3-nitrobutane;
3-methoxy-3-methyl-2-methylcarbamyloximino-1-methylthiobutane;
3-cyano-3-methyl-2-methylcarbamyloximino-1-methylthiobutane;
1azido-3-methyl-2-methylcarbamyloximino-3-methylthiobutane;
1-azido-3-methoxy-3-methyl-2-methylcarbamyloximinobutane;
3-azido-3-methyl-2-methylcarbamyloximino-1-methylthiobutane;
3-azido-1-methoxy-3-methyl-2-methylcarbamyloximinobutane;
1-methoxy-3-methyl-2-methylcarbamyloximino-3-nitrobutane;
1-methoxy-3-methyl-2-methylcarbamyloximino-3-methylthiobutane;
3-cyano-1-methoxy-3-methyl-2-methylcarbamyloximinobutane;
1,3-bis(methoxy)-3-methyl-2-methylcarbamyloximinobutane;
1,3-bis(cyano)-3-methyl-2-methylcarbamyloximinobutane;
1-cyano-3-methyl-2-methylcarbamyloximino-3-methylthiobutane;
1-cyano-3-methoxy-3-methyl-2-methylcarbamyloximinobutane;
1-nitro-3-methyl-2-methylcarbamyloximino-3-methylthiobutane;
1-nitro-3-methoxy-3-methyl-2-methylcarbamyloximinobutane;
3-methyl-3-dimethylamino-2-methylcarbamyloximino-1-methylthiobutane;
1-methoxy-3-methyl-3dimethylamino-2-methylcarbamyloximinobutane;
3-methyl-1-dimethylamino-2-methylcarbamyloximino-3-methylthiobutane;
3-methoxy-3-methyl-1-dimethylamino-2-methylcarbamyloximinobutane; and the like;

as well as compounds wherein $R_5$ is X as, for example:

1,1-bis(methylthio)-3,3-dimethyl-2-methylcarbamyloximinobutane;
1,1-bis(methoxy)-3,3-dimethyl-2-methylcarbamyloximinobutane;
1-methoxy-3,3-dimethyl-2-methylcarbamyloximino-1-methylthiobutane;
1,1-ethylenedithio-3,3-dimethyl-2-methylcarbamyloximinobutane;
3,3-dimethyl-2-methylcarbamyloximino-1,1-(1,2-propylenedithio)-butane;
3,3-dimethyl-2-methylcarbamyloximino-1,1-(1,3-propylenedithio)-butane;
1,1-ethylenedioxy-3,3-dimethyl-2-methylcarbamyloximinobutane;
3,3-dimethyl-2-methylcarbamyloximino-1,1-(1,2-propylenedioxy)-butane;
3,3-dimethyl-2-methylcarbamyloximino-1,1-(1,3-propylenedioxy)-butane;
2,2-dimethyl-1-methylcarbamyloximino-1-(1,3-oxathiolan-2-yl)-propane;
2,2-dimethyl-1-methylcarbamyloximino-1-(1,3-oxathian-2-yl)-propane;
2,2-dimethyl-1-methylcarbamyloximino-1-(3-methyl-1,3-oxazolidin-2-yl)-propane;
2,2-dimethyl-1-methylcarbamyloximino-1-(3-methyltetrahydro-1,3-oxazin-2-yl)-propane;
2,2-dimethyl-1-methylcarbamyloximino-1-(1,3-dimethylimidazolidin-2-yl)propane;
2,2-dimethyl-1-methylcarbamyloximino-1-(1,3-dimethylpyrimidin-2-yl)propane;
2,2-dimethyl-1-methylcarbamyloximino-1-(3-methylthiazolidin-2-yl)propane;
2,2-dimethyl-1methylcarbamyloximino-1-(3-methyltetrahydro-1,3-thiazin-2-yl)propane; and the like.

Additional examples of these compounds include:

3,3-dimethyl-2-methylcarbamyloximino-1-(2-methylthioethylthio)-butane;
1-(2-ethylthioethylthio)-3,3-dimethyl-2-methylcarbamyloximinobutane;
1-(2-methoxyethylthio)-3,3-dimethyl-2-methylcarbamyloximinobutane;
1-(2-ethoxyethylthio)-3,3-dimethyl-2-methylcarbamyloximinobutane;
3,3-dimethyl-2-methylcarbamyloximino-1-(2-methylsulfinylethylthio)butane;
3,3-dimethyl-2-methylcarbamyloximino-1-(2-methylsulfonylethylthio)butane;
1-(2-methoxyethoxy)-3,3-dimethyl-2-methylcarbamyloximinobutane;
3,3-dimethyl-2-methylcarbamyloximino-1-(2-methylthioethoxy)-butane;
3,3-dimethyl-2-methylcarbamyloximino-1-(2-methylthiomethylthio)-butane;
1-(2-methoxymethylthio)-3,3-dimethyl-2-methylcarbamyloximinobutane;
1-(2-methoxymethoxy)-3,3-dimethyl-2-methylcarbamyloximinobutane;
3,3-dimethyl-2-methylcarbamyloximino-1-(3,3,3-trifluoropropylthio)butane;
1-(3,3,3-trichloropropylthio)-3,3-dimethyl-2-methylcarbamyloximinobutane;
1-(2-cyanoethylthio)-3,3-dimethyl-2-methylcarbamyloximinobutane;
3,3-dimethyl-1-(2-dimethylaminoethylthio)-2-methylcarbamyloximinobutane;
3,3-dimethyl-2-methylcarbamyloximino-1-(2-phenethylthio)butane;
3,3-dimethyl-2-methylcarbamyloximino-1-(2-(2'-thenyl)ethylthio)-butane;
3,3-dimethyl-2-methylcarbamyloximino-1-propargylthiobutane; 1-cyano-3,3-dimethyl-2-methylcarbamyloximinobutane;
3,3-dimethyl-2-methylcarbamyloximino-1-nitrobutane; and the like.

Although the above compounds are, for purpose of illustration, N-methylcarbamates, the carbamate nitrogen of these compounds can be unsubstituted, as in the simple carbamates, or can be substituted with a single alkyl, alkenyl, or alkynyl substituent such as methyl, ethyl, n-propyl, isopropyl, n-butyl, isobutyl, allyl, propargyl, or the like, or can be substituted with two alkyl, alkenyl, or alkynyl groups, with the groups being the same or different, to give, for example, N,N-dimethylcarbamyloximes; N,N-diethylcarbamyloximes; N-methyl-N-ethylcarbamyloximes; N,N-di-n-propylcarbamyloximes; N-methyl-N-propylcarbamyloximes; N,N-diallylcarbamyloximes; N,N-dipropargyloximes; N-methyl-N-allylcarbamyloximes; N-methyl-N-propargylcarbamyloximes; and the like.

It will be appreciated by those skilled in the art that the ketoxime derivatives of this invention may exist in two geometric forms, the syn and the anti, representing the cis and trans isomers around the oxime double bond. Both isomers and their mixtures are intended to be included in the scope of this invention.

These compounds can be prepared by one of several methods. One method involves reaction of an isocyanate with an oxime as shown, for example, in the equation:

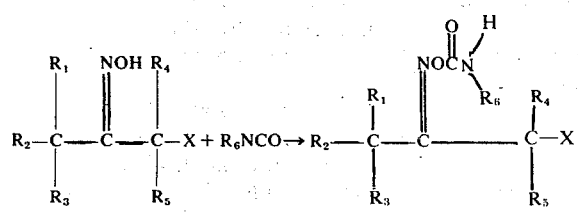

wherein $R_1$ through $R_6$ and X are as defined above. The oxime and isocyanate are reacted in an inert organic solvent from about 0° C to about 150° C, preferably from about 20° C to about 80° C, and at a pressure from about 1 to about 10 atmospheres, preferably from about 1 to about 3 atmospheres. Reaction pressure is determined by reaction temperature, concentration and vapor pressure of the isocyanate.

Any inert organic solvent used in the reaction should not contain hydroxy, amino or other groups which will react with the isocyanate function. Useful inert solvents include aliphatic and aromatic hydrocarbons, such as hexane, heptane, octane, benzene, toluene, xylene; ethers such as diethyl ether, dipropyl ether, ethyl propyl ether; esters such as ethyl acetate, ethyl propionate; ketones such as acetone, methyl ethyl ketone; and chlorinated hydrocarbons such as methylene chloride, perchloroethylene, and the like.

Preferably, reaction is carried out in the presence of from about 0.1 to about 1.0 percent by weight, based on the weight of reactants, of a tertiary amine catalyst such as triethyl amine, N,N-dimethylaniline, or the like.

The molar ratio of isocyanate to oxime can vary from about 0.1:1 to about 10:1. An equimolar amount or slight excess of isocyanate is preferred to ensure complete reaction of the oxime. Reaction times can vary from a few minutes to several days. Usually reaction times of from about one-half to about six hours are sufficient.

A second method for preparing these compounds involves reaction of an oxime with phosgene to obtain an oxime chloroformate which is then reacted with an amine. This method is illustrated in Equations (1) and (2) below:

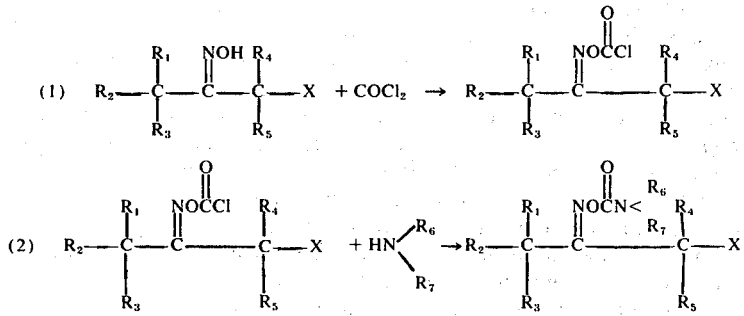

wherein $R_1$ through $R_7$ and X are as defined above. The method is carried out in two steps following the reactions shown in Equations (1) and (2).

In the reaction shown in Equation (1), a solution of the oxime dissolved in an inert solvent such as diethyl ether, is added slowly to a solution of phosgene dissolved in an inert solvent in the presence of an HCl acceptor such as a tertiary amine, e.g., N,N-dimethylaniline. Reaction is carried out from about −30° C to about 100° C, preferably at from about 0° C to about 50° C. The resulting reaction mixture, a solution of the chloroformate in an inert organic solvent, can be filtered or washed with water to remove amine hydrochloride before it is used in the reaction shown in Equation (2).

In the reaction shown in Equation (2), an amine is added to the chloroformate solution in the presence of an amine solvent such as water, at temperatures between about −40° C and about 80° C, preferably at about 0° C to about 40° C. A larger than molar excess of amine can be used so that the amine acts both as reactant and as HCl acceptor and complete conversion of chloroformate is obtained. Alternatively, a separate HCl acceptor, such as tertiary amine, can be used.

Liquid or solid carbamates produced by the above methods can be recovered from the reaction mixtures by conventional means. For example, they can be recovered by removal of solvent and excess amine or isocyanate by vacuum distillation. Although these products are obtained in very pure form, they can be further purified, if desired, by recrystallization, distillation, absorption chromatography, or other known procedures.

Ketoxime intermediates useful in this invention can be prepared by well known procedures such as reaction of the ketone with hydroxylamine in aqueous ethanol. Hydrocarbyloxy or thio ketones can be prepared by reaction of the haloketones with mercaptans or alcohols in the presence of the acid acceptor, e.g., sodium alkoxide. Sulfinyl and sulfonyl linked compounds can be prepared by oxidizing the appropriate sulfide linked compound with sodium metaperiodate or acidic hydrogen peroxide, respectively.

Although the compounds of this invention can be applied in undiluted form to the plant or other material being treated, it is usually desirable to apply these compounds in admixture with either solid or liquid inert, pesticidal adjuvants. For example, the compounds can be applied to plants for pesticidal purposes by spraying the plants with aqueous or organic solvent dispersions of the compounds. Choice of an appropriate solvent is determined by factors such as concentration of active ingredient, the volatility required in the solvent, cost of the solvent, and nature of the material being treated.

Solvents, which can be employed as carriers for these compounds, include hydrocarbons such as benzene, toluene, xylene, kerosene, diesel oil, fuel oil, hydrocarbons, and naphthas; ketones such as acetone, methyl ethyl ketone and cyclohexanone; chlorinated hydrocarbons such as trichloroethylene, perchloroethylene; esters such as ethyl acetate, amyl acetate and butyl acetate; ethers of ethylene glycol such as the monomethyl and monoalkyl ethers of diethylene glycol, the monoethyl ether of propylene glycol; alcohols such as ethanol, isopropanol, pentanols, and the like.

These compounds can also be applied to plants and other materials in conjunction with inert solid adjuvants or carriers such as talc, pyrophyllite, attapulgite, chalk, diatomaceous earth, koalinite, montmorillonite, other silicates, silica, lime, calcium carbonate, certain organic carriers such as walnut shell flour, wood flour, ground corn cobs, and the like.

It is often desirable to use a surfactant (a surface active agent) in pesticidal compositions. An anionic, nonionic or cationic surfactant can be used in the formulation of either solid or liquid compositions. Typical surfactants include alkyl sulfonates, alkylaryl sulfonates, alkyl sulfates, alkylamide sulfonates, alkylaryl polyether alcohols, fatty acid esters of polyhydric alcohols, ethylene oxide addition products of these esters; ethylene oxide addition products of long-chain mercaptans; sodium alkyl benzene sulfonates having 12 to 18 carbon atoms; ethylene oxide addition products of alkylphenols, such as phenol condensed with 10 moles of ethylene oxide; cetyl pyridinium chloride; soaps such as sodium stearate and sodium oleate.

Solid and liquid formulations can be prepared by any suitable method. Solid active ingredients, in finely divided form, can be tumbled together with a finely divided solid carrier. Alternatively, the active ingredient in liquid forms such as solutions, dispersions, emulsions or suspensions, can be admixed with the solid carrier in finely divided form in amounts small enough to preserve the free-flowing property of the final dust compositions.

When solid formulations are used, in order to obtain a high degree of coverage with a minimum dosage, it is desirable that the formulation be in the form of a finely divided powder or dust sufficiently fine that substantially all of the solids will pass through a Tyler sieve having a mesh size between about 20 and about 200.

In dust formulations, the active ingredient can be present in an amount of 5 to 50 percent of the total weight. However, concentrations outside this range are operative and compositions containing from 1 to 99 percent of active ingredient by weight are contemplated wherein the remainder is carrier and/or any other desired additive or adjuvant. It may be advantageous to add a small amount of surfactant, e.g., 0.5 to 1 percent by weight based on the total weight of the dust formulation.

For spray application, the active ingredient may be dissolved or dispersed in a liquid carrier, such as water or other suitable liquid. The active ingredient can be added in the form of a solution, suspension, dispersion or emulsion in aqueous or nonaqueous medium. Desirably, 0.5 to 1.0 percent by weight of surfactant is present in the liquid composition.

For adjuvant purposes, any desired quantity of surfactant may be employed, such as up to 250 percent by weight of the active ingredient. If the surfactant is used only to impart wetting qualities to a spray solution, as little as 0.05 percent or less, by weight of the surfactant need be used. Larger quantities of surfactant are used because of biological behavior of the surfactant rather than its wetting properties. These considerations are particularly important in the treatment of plants. The active ingredient in liquid formulations often may not be more than 30 percent by weight of the total and may be 10% by weight or even as low as 0.01 percent by weight.

For systemic application, it may be desirable to apply the pesticide to the soil in the form of granules of an inert material coated with or incorporating the active ingredient. Reasons for the use of pesticidal granules include elimination of water during application, reduction of drift, penetration through vegetative coverage, easy handling, storage, and increased safety to handlers of the pesticides. Useful granule base materials include attapulgite, montmorillonite, corn cobs, walnut shells, and expanded vermiculites. Depending on their physical properties, the pesticides are either directly sprayed on the preformed granular base or are dissolved in a suitable solvent and then sprayed onto the granular base after which the solvent is removed by evaporation. Granule base materials are usually 60 to 14 U.S. sieve size particles, although other size particles may also be used.

Terms "pesticide" and "pesticidal" as used herein are intended to refer to the killing and/or control of insects, mites, nematodes, or the like. It will be appreciated that applications commonly referred to as insecticidal, miticidal, nematocidal, or the like are contemplated in the employment of these terms.

For a fuller understanding of the nature and objects of this invention, reference may be made to the following examples which are given to illustrate the invention and are not to be construed in a limiting sense. The infrared spectrum for each product described herein is consistent with the assigned structure. All percentages, proportions, and quantities given in these examples are by weight unless otherwise indicated. Likewise, all references to temperature are as °C unless otherwise indicated.

EXAMPLE 1

3,3-Dimethyl-1-tert.-butylthio-2-butanone (Compound 7569)

To a solution of 5.8 g (0.25 m) of sodium metal in 175 ml of absolute ethanol is added, dropwise, 24.4 g (0.27 m) of 2-methyl-2propanethiol. The stirred solution is heated for 20 minutes, cooled, and treated in a dropwise manner with 44.8 g (0.25 m) of 1-bromopinacolone, prepared according to the procedure of J. Am. Chem. Soc., 74, 4507 (1952). This reaction mixture is heated at reflux for 20 minutes, cooled, and poured onto 200 g of ice and water. After being saturated with sodium chloride, the mixture is extracted with four portions of ether. The combined ether extracts are dried over anhydrous magnesium sulfate, filtered, and stripped of solvent. Distillation of the residue through a short Vigreaux column gives the desired product. Properties of this, and similar compounds prepared by substantially the same procedure using the appropriate mercaptans and α-haloketones, are given in Tables 1 and 2.

EXAMPLE 2

3,3-Dimethyl-1-tert.-butylthio-2-butanone oxime (Compound 7604)

A solution of 27 g (0.14 m) of 3,3-dimethyl-1-tert.-butylthio-2-butanone, 19.5 g (0.28 m) of hydroxylamine hydrochloride and 14.8 g (0.14 m) of anhydrous sodium carbonate in a mixture of 200 ml of 95% ethanol and 110 ml of water is heated at reflux for 19.5 hours. Stripping of volatiles on a rotary evaporator gives a slurry which is filtered to obtain the white solid oxime product. Properties of this and related compounds prepared by substantially the same procedure are given in Tables 3 and 4. Where the oxime product is a liquid, isolation is accomplished by ethyl acetate extraction of the residue left after removal of the volatiles and subsequent stripping of the dried extract.

EXAMPLE 3

Carbamate Preparation — Method A 3,3-Dimethyl-2-methylcarbamyloximino-1-tert.-butylthiobutane (Compound 7619)

A solution of 4.7 g (0.023 m) of 3,3-dimethyl-1-tert.-butylthio-2-butanone oxime, 1.4 g (0.025 m) of methyl isocyanate, and three drops of triethylamine in 35 ml of anhydrous ether is heated at reflux for 16.5 hours. Stripping of volatiles on a rotary evaporator gives the desired product as a white solid. Properties of this and analogous compounds prepared by substantially the same procedure are given in Tables 5 and 6.

EXAMPLE 4

Carbamate Preparation — Method B

2-Carbamyloximino-3,3-dimethyl-1-methylthiobutane (Compound 7859)

To a chilled solution of 5.4 g (0.055 m) of phosgene in 50 ml of anhydrous ether is added, dropwise, 6.1 g (0.05 m) of N,N-dimethylaniline followed by a solution of 8.1 g (0.05 m) of 3,3-dimethyl-1-methylthio-2-butanone oxime in 50 ml of ether. The mixture is stirred for two hours, as it is allowed to come to room temperature, and then filtered. The chilled filtrate is treated over 15 minutes with 10 ml (0.15 m) of 29% aqueous ammonia. After being stirred for an additional 15 minutes, the organic layer is separated, washed with water, and dried. Stripping of solvent from the dried organic layer gives 10.1 g of a clear liquid residue which solidifies on standing. Properties of this and analogous compounds prepared by substantially the same procedure as shown in Tables 5 and 6.

EXAMPLE 5

Carbamate Preparation — Method C 3,3-Dimethyl-2-methylcarbamyloximino-1-(1-pyrrolidinyl)-butane (Compound 7870)

To a solution of 12.6 g of 1-bromo-3,3-dimethyl-2-methylcarbamyloximinobutane in 100 ml of anhydrous ether is added, dropwise, 7.8 (0.11 m) of pyrrolidine. The mixture is stirred at room temperature for 1 hour and at reflux for 0.5 hour, then cooled and washed with water. The ether solution is separated, dried, and stripped of solvent to give 11.8 g of amber oil which solidifies on standing to an amber solid, m. 43°–46° C. Properties of this and analogous compounds prepared by substantially the same procedure are shown in Tables 5 and 6.

EXAMPLE 6

1-Bromo-3,3-dimethyl-2-butanone oxime (Compound 7666)

A solution of 69.5 g (1.0 m) of hydroxylamine hydrochloride in 100 ml of water is chilled in an ice bath as 90 g (0.5 m) of 1-bromo-3,3-dimethyl-2-butanone is added. After addition of 100 ml of 95% ethanol, the mixture is stirred for 16 hours and allowed to warm to room temperature. The resulting white slurry is filtered, and the solid is washed with water and dried to give 55 g of the desired compound, m. 111°–112° C.

Calc'd. for $C_6H_{12}NBrO$: N, 7.2%; Br, 41.2%. Found: N, 7.1%; Br, 42.4%.

EXAMPLE 7

3,3-Dimethyl-1-nitro-2-butanone oxime (Compound 7668)

To a stirred solution of 18.2 g (0.26 m) of sodium nitrite in 130 ml of dimethyl sulfoxide is added, in portions, 29.0 g (0.15 m) of 1-bromo-3,3-dimethyl-2-butanone oxime. A mild exotherm results and external cooling is used to keep the temperature below 27° C. Additional solvent is added to maintain stirrability. After 20 hours stirring, the mixture is poured onto ice and water to give a solid which is collected on a filter. The 10 g of solid, m. 115°–120° C, thus obtained is recrystallized from a hot benzene-petroleum ether mixture to give 7 g of white crystals, m. 124°–125° C.

Calc'd. for $C_6H_{12}N_2O_3$: C, 45.0%; H, 7.6%. Found: C, 45.2%; H, 7.8%.

EXAMPLE 8

3,3-Dimethyl-2-methylcarbamyloximino-1-methylsulfinylbutane (Compound 7804)

A stirred mixture of 9.0 g (0.042 m) of sodium metaperiodate in 60 ml of water and 25 ml of methanol is cooled to 0° C as 8.7 g (0.04 m) of 3,3-dimethyl-2-methylcarbamyloximino-1-methylthiobutane is added in portions. After stirring at 0°–10° C for 18 hours, the mixture is allowed to warm to room temperature and stripped of volatiles on a rotary evaporator to give a residue which is extracted with ethyl acetate. The dried extract is stripped to leave 9 g (96%) of viscous yellow oil, the desired compound.

Calc'd. for $C_9H_{18}N_2O_3S$: C, 46.1%; H, 7.7%. Found: C, 45.2%; H, 7.5%.

EXAMPLE 9

2,2-Dimethyl-3-methylcarbamyloximino-4-methylthiopentane (Compound 8071)

To a solution of sodium thiomethoxide prepared from 4.1 g (0.18 gram atom) of sodium, 8.7 g (0.21 m) of methanethiol and 110 ml of ethanol is added 34.5 g (0.18 m) of 4-bromo-2,2-dimethyl-3-pentanone over 25 minutes at 0° ± 5° C. After being heated to 40°–45° C for 30 minutes, the solution is filtered, stripped of solvent and distilled to give 12 g (42%) of colorless liquid, b. 57° C/4.3 mm, $n_D^{25}$ 1.4589.

Calc'd. for $C_8H_{16}OS$: C, 59.9%; H, 10.1%. Found: C, 59.2%; H, 10.1%.

This compound (7 g, 0.044 m) and 18 g (0.26 m) of hydroxylamine hydrochloride in 150 ml of absolute ethanol containing 30 ml of pyridine are heated under reflux for 120 hours. Pouring the clear solution into ice water gives a solid which is collected and dried. This white solid, m. 128°–129° C, is the desired compound, 2,2-dimethyl-4-methylthio-3-pentanone oxime.

Calc'd. for $C_8H_{17}NOS$: C, 54.8%; H, 9.8%; N, 8.0%. Found: C, 54.3%; H, 9.4%; N, 7.8%.

A solution of 4.6 g (0.026 m) of this oxime, 1.7 g (0.029 m) of methyl isocyanate, and three drops of triethylamine in 60 ml of benzene is heated under reflux for 17 hours. Stripping of volatiles gives 6.2 g of solid residue, m. 93°–94° C, which is the desired compound.

Calc'd. for $C_{10}H_{20}N_2O_2S$: C, 51.7%; H, 8.7%; N, 12.1%. Found: C, 51.6%; H, 8.5%; N, 12.1%.

EXAMPLE 10

4,4-Dimethyl-3-methylcarbamyloxyimino-1-methylthiopentane (Compound 8111)

A solution of sodium thiomethoxide, prepared from 5.8 g (0.25 gram atom) of sodium 13.5 g (0.28 m) of methanethiol, and 170 ml of absolute ethanol, is treated with 36.6 g (0.25 m) of 1-chloro-4,4-dimethyl-3-pentanone at −3° to 8° C over 30 minutes. After being heated at 40°–45° C for 45 minutes, the mixture is filtered and distilled to give 12 g of colorless liquid, b. 73° C/2 mm, $n_D^{24}$ 1.4623.

Calc'd. for $C_8H_{16}OS$: C, 59.9%; H, 10.1%. Found: C, 60.1%; H, 10.0%.

A solution of 22.5 g (0.14 m) of this ketone and 58.4 g (0.84 m) of hydroxylamine hydrochloride in 525 ml of absolute ethanol and 105 ml of pyridine is heated under reflux for 48 hours. Pouring the reaction mixture into ice water gives 17.8 g of a white solid, m. 84° C, which is the desired 4,4-dimethyl-1-methylthio-3-pentanone oxime.

Calc'd. for $C_8H_{17}NOS$: N, 8.0%. Found: N, 8.1%.

Refluxing a solution of 5.3 g (0.03 m) of this oxime, 1.9 g (0.033 m) of methyl isocyanate, and three drops of triethylamine in 50 ml of anhydrous ether gives, after stripping of volatiles, 7.6 g of white solid residue, m. 56°–58° C, which is the desired compound.

Calc'd. for $C_{10}H_{20}N_2O_2S$: C, 51.7%; H, 8.7%; N, 12.1%. Found: C, 51.6%; H, 8.5%; N, 12.5%.

EXAMPLE 11

1-Cyclohexyl-1-methylcarbamyloximino-2-methylthioethane (Compound 8169)

To a solution of 10.8 g (0.47 m) of sodium in 330 ml of absolute ethanol is added 25 g (0.52 m) of methanethiol followed by 76 g (0.47 m) of chloroacetylcyclohexane. Both additions are carried out at about 0° C. After being heated at 40°–45° C for 1 hour, the reaction mixture is filtered, stripped, and distilled to give 29.8 g of colorless liquid, b. 88°–89° C/0.6-1.3 mm, $n_D^{24}$ 1.4970, the desired ketone.

Calc'd. for $C_9H_{16}OS$: C, 62.7%; H, 9.4%. Found: C, 63.0%; H, 8.6%.

A solution of 26 g (0.15 m) of the 1-methylthioacetyl-cyclohexane, 21 g (0.3 m) of hydroxylamine hydrochloride, and 16 g (0.15 m) of anhydrous sodium carbonate in 155 ml of 95% ethanol and 104 ml of water is heated under reflux for 41 hours. Stripping of volatiles gives 18 g of solid, m. 63°–64° C, which is the desired oxime.

Calc'd. for $C_9H_{17}NOS$: C, 57.7%; H, 9.2%; N, 7.5%. Found: C, 57.5%; H, 9.0%; N, 7.4%.

Heating a solution of 5.6 g (0.03 m) of this oxime, 1.9 g (0.033 m) of methyl isocyanate, and three drops of triethylamine in 50 ml of absolute ether at reflux for 17 hours gives, after removal of volatiles, 7.3 g of solid which is recrystallized from ethanol-water to obtain a white solid, m. 70°–71° C, which is the desired compound.

Calc'd. for $C_{11}H_{20}N_2O_2S$: C, 54.1%; H, 8.3%; N, 11.5%. Found: C, 54.2%; H, 8.3%; N, 11.7%.

EXAMPLE 12

1-Methylcarbamyloximino-1-(1-methylcyclohexyl)-2-methylthioethane (Compound 8179)

1-(Methylthioacetyl)-1-methylcyclohexane is prepared by treating a solution of sodium thiomethoxide [from 3 g (0.13 gram atom) of sodium, 6.7 g (0.14 m) of methanethiol, and 95 ml of absolute ethanol] with 22.5 g (0.13 m) of 1-chloroacetyl-1-methylcyclohexane over 20 minutes at 4°–9° C. After being heated at 40°–45° C for 1 hour, the reaction mixture is filtered and distilled to give 7 g of colorless liquid, b. 86°–87° C/0.8 mm, $n_D^{24}$ 1.4954.

Calc'd. for $C_{10}H_{18}OS$: C, 64.5%; H, 9.7%. Found: C, 64.0%; H, 9.6%.

This ketone is converted to the oxime by heating a solution of 5 g (0.027 m) of ketone, 3.8 g (0.054 m) of hydroxylamine hydrochloride, and 3 g (0.027 m) of anhydrous sodium carbonate in 30 ml of 95% ethanol and 26 ml of water for 95 hours. The resulting solution is stripped of volatiles, to give a two-layer liquid residue, which is extracted with ethyl acetate. The organic layer is dried, filtered, and stripped to give 3.4 g of amber liquid, $n_D^{24}$ 1.5164.

Calc'd. for $C_{10}H_{19}NOS$: C, 59.7%; H, 9.5%; N, 7.0%. Found: C, 59.8%; H, 9.5%; N, 7.0%.

A solution of 2.2 g (0.011 m) of this oxime, 0.7 g (0.012 m) of methyl isocyanate, and three drops of triethylamine in 25 ml of anhydrous ether is heated at reflux for 16 hours. Stripping of volatiles gives 3.5 g of amber viscous liquid, $n_D^{25}$ 1.5200, which is the desired compound.

Calc'd. for $C_{12}H_{22}N_2O_2S$: C, 55.8%; H, 8.6%. Found: C, 55.7%; H, 8.6%.

EXAMPLE 13

1-(1-Adamantyl)-1-methylcarbamyloximino-2-methylthioethane (Compound 8191)

A solution of 4 g (0.018 m) of 1-methylthioacetyladamantane, 2.5 g (0.036 m) of hydroxylamine hydrochloride, and 1.9 g (0.018 m) of anhydrous sodium carbonate in 20 ml of 95% ethanol and 18 ml of water is heated under reflux for 29 hours. Stripping of volatiles gives a slurry which is filtered to obtain 4.2 g of white solid oxime, m. 100°–103° C.

Calc'd. for $C_{13}H_4NOS$: C, 65.2%; H, 8.8%; N, 5.9%. Found: C, 65.5%; H, 8.8%; N, 5.6%.

A solution of 3 g (0.013 m) of this oxime, 0.8 g (0.014 m) of methyl isocyanate, and three drops of triethylamine in 50 ml of anhydrous ether is heated under reflux for 17 hours. Stripping of volatiles gives 3.9 g of white solid, m. 99°–100° C, which is the desired compound.

Calc'd. for $C_{15}H_{24}N_2O_2S$: C, 60.8%; H, 8.2%; N, 9.5%. Found: C, 60.2%; H, 8.1%; N, 9.5%.

EXAMPLE 14

1-Chloro-4,4-dimethyl-2-methylcarbamyloximinopentane (Compound 8108)

To a chilled, stirred mixture of 20.2 g (0.29 m) of hydroxylamine hydrochloride in 30 ml of water is added 21.5 g (0.145 m) of 1-chloro-4,4-dimethyl-2-pentanone followed by 30 ml of 95% ethanol. The cooled mixture is stirred for six hours, allowed to stand overnight, and stripped of volatiles to obtain a residue which is extracted with ethyl acetate. This extract is dried, stripped, and distilled to yield a colorless liquid, b. 76°–77° C/1.3 mm, $n_D^{24}$ 1.4672, which is the desired oxime.

Calc'd. for $C_7H_{16}ClNO$: C, 51.4%; H, 8.6%; N, 8.6%. Found: C, 50.7%; H, 8.4%; N, 8.1%.

A solution of 7 g (0.043 m) of the above oxime, 2.7 g (0.047 m) of methyl isocyanate, and three drops of triethylamine in 50 ml of anhydrous ether is heated under reflux for 17 hours. Stripping of volatiles gives the desired carbamate as a colorless, viscous liquid, $n_D^{24}$ 1.4802.

Calc'd. for $C_9H_{17}ClN_2O_2$: N, 12.7%. Found: N, 12.8%.

EXAMPLE 14A

3,3-Dimethyl-2-methylcarbamyloximino-1-methylsulfonyloxybutane (Compound 9350)

A solution of 7.5 g (0.04 m) of 1-hydroxy-3,3-dimethyl-2-methylcarbamyloximinobutane and 5.0 g (0.044 m) of methanesulfonyl chloride in 50 ml of benzene is treated dropwise with 4.6 g (0.044 m) of triethylamine with cooling to keep the temperature below 35° C. After the addition, the stirred mixture is heated at 35° C for two hours and then washed with aqueous sodium bicarbonate and with water. The organic layer is dried over magnesium sulfate, filtered, and stripped of volatiles to give 6.7 g (63%) of amber, viscous liquid residue, $n_D^{25}$ 1.4810.

Calc'd. for $C_9H_{18}N_2O_2S$: C, 40.6%; H, 6.8%; N, 10.5%. Found: C, 41.2%; H, 6.8%; N, 10.5%.

Example 5 describes Method C for preparing these compositions wherein a compound of the formula

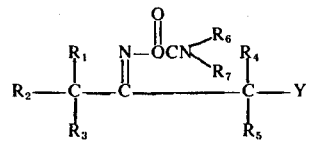

having a reactive halogen radical Y, such as chlorine or bromine is reacted with HX having an X radical, as defined above, in the presence of an HY acceptor. Table 6 shows other compositions prepared by Method C.

TABLE 1

KETONES

| Compound Number | Chemical Name |
|---|---|
| 7218 | 3,3-dimethyl-1-methylthio-2-butanone |
| 7443 | 1-carbomethoxymethylthio-3,3-dimethyl-2-butanone |
| 7533 | 1-methylthio-2-propanone |
| 7557 | 3-methyl-3-methylthio-2-butanone |
| 7558 | 1-isopropylthio-3,3-dimethyl-2-butanone |
| 7569 | 3,3-dimethyl-1-tert.-butylthio-2-butanone |
| 7572 | 1-isobutylthio-3,3-dimethyl-2-butanone |
| 7573 | 1-allylthio-3,3-dimethyl-2-butanone |
| 7637 | 1-benzylthio-3,3-dimethyl-2-butanone |
| 7665 | 3,3-dimethyl-1-phenylthio-2-butanone |
| 7667 | 1,3-bis(methylthio)-3-methyl-2-butanone |
| 7765 | 3,3-dimethyl-1-phenoxy-2-butanone |
| 7807 | 1,3-bis(methylthio)-2-propanone |
| 7837 | 3-methyl-1-methylthio-2-butanone |
| 7838 | 3,3-dimethyl-1-n-propylthio-2-butanone |
| 7860 | 1-ethylthio-3,3-dimethyl-2-butanone |
| 7900 | 1-methylthio-2-butanone |
| 7909 | 3,3-dimethyl-1-methylthio-2-hexanone |
| 7965 | 4,4-dimethyl-1-methylthio-3-pentanone |
| 8059 | 1-chloro-4,4-dimethyl-2-pentanone |
| 8126 | 1-methyl-1-(methylthioacetyl)-cyclohexane |
| 8127 | methylthioacetylcyclohexane |
| 8373 | methylthioacetylcyclopropane |
| 8504 | 4,4-dimethyl-1-methylthio-2-pentanone |
| 9011 | 4-methyl-1-methylthio-2-pentanone |
| 9061 | 1-methylthio-2-pentanone |
| 9274 | 1,1-bis(methylthio)-3,3-dimethyl-2-butanone |
| 9275 | 1-(2-ethylthioethylthio)-3,3-dimethyl-2-butanone |
| 9278 | 1-methoxy-3,3-dimethyl-2-butanone |
| 9380 | 1-(3,3,3-trifluoropropylthio)-3,3-dimethyl-2-butanone |
| 9382 | 1-(3,3,3-trichloropropyl)-3,3-dimethyl-2-butanone |
| 9383 | 3,3-dimethyl-1-(2-phenylethylthio)-2-butanone |
| 9385 | 3,3-dimethyl-1-propargylthio-2-butanone |

TABLE 2

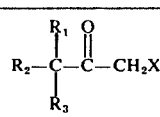

| Compound Number | R₁ | R₂ | R₃ | X | Boiling Range in °C/mm Hg | Refractive Index/°C | Percent Yield | Analysis Calculated | | Found | |
|---|---|---|---|---|---|---|---|---|---|---|---|
| 7218 | CH₃— | CH₃— | CH₃— | CH₃S— | 73/9.3 | 1.4650/24 | 62 | | | | |
| 7443 | CH₃— | CH₃— | CH₃— | CH₃OCOCH₂S— | 94/0.8 | 1.4720/24 | 64 | C | 52.9 | C | 52.6 |
| | | | | | | | | H | 7.9 | H | 7.5 |
| 7533 | H— | H— | H— | CH₃S— | 63-4/29 | 1.4691/24 | 45 | C | 46.1 | C | 46.9 |
| | | | | | | | | H | 7.7 | H | 7.9 |
| 7557 | CH₃— | CH₃— | CH₃S— | H— | 48/8.1 | 1.4625/24 | 57 | C | 54.5 | C | 54.2 |
| | | | | | | | | H | 9.2 | H | 9.2 |
| 7558 | CH₃— | CH₃— | CH₃— | (CH₃)₂CHS— | 96/8.9 | 1.4568/24 | 68 | C | 62.0 | C | 61.8 |
| | | | | | | | | H | 10.4 | H | 10.2 |
| 7569 | CH₃— | CH₃— | CH₃— | (CH₃)₃CS— | 84-92/9.8 | 1.4595/24 | 67 | C | 63.8 | C | 63.6 |
| | | | | | | | | H | 10.7 | H | 10.6 |
| 7572 | CH₃— | CH₃— | CH₃— | (CH₃)₂CHCH₂S— | 101/9.8 | 1.4592/24 | 62 | C | 63.8 | C | 63.1 |
| | | | | | | | | H | 10.7 | H | 10.8 |
| 7573 | CH₃— | CH₃— | CH₃— | CH₂=CHCH₂S— | 58-9/1.2 | 1.4762/24 | 24 | C | 62.7 | C | 62.8 |
| | | | | | | | | H | 9.4 | H | 9.1 |
| 7637 | CH₃— | CH₃— | CH₃— | C₆H₅CH₂S— | 104.5-106/0.5-0.6 | 1.5306/24 | 57 | C | 70.2 | C | 70.9 |
| | | | | | | | | H | 8.2 | H | 9.0 |
| 7665 | CH₃— | CH₃— | CH₃— | C₆H₅S— | 102/0.5 | 1.5425/24 | 38 | C | 69.2 | C | 70.0 |
| | | | | | | | | H | 7.7 | H | 7.7 |
| 7667 | CH₃— | CH₃— | CH₃S— | 91-5/3.9 | 1.5138/23 | | 56 | C | 7.2 | C | 6.8 |
| | | | | | | | | H | 7.9 | H | 7.8 |

TABLE 2-continued $$R_2-\underset{\underset{R_3}{|}}{\overset{\overset{R_1}{|}}{C}}-\overset{\overset{O}{\|}}{C}-CH_2X$$

| Compound Number | $R_1$ | $R_2$ | $R_3$ | X | Boiling Range in °C/mm Hg | Refractive Index/°C | Percent Yield | Analysis Calculated | | Found | |
|---|---|---|---|---|---|---|---|---|---|---|---|
| 7765[a] | $CH_3-$ | $CH_3-$ | $CH_3-$ | $C_6H_5O-$ | 106–8/1.8 | 1.5036/23 | 72 | — | | — | |
| 7807[b] | $CH_3S-$ | H— | H— | $CH_3S-$ | 108/9.5 | 1.5302/24 | 27 | — | | — | |
| 7837 | $CH_3-$ | $CH_3-$ | H— | $CH_3S-$ | 61/8 | — | 48 | C | 54.6 | C | 54.9 |
|  |  |  |  |  |  |  |  | H | 9.1 | H | 9.7 |
| 7838 | $CH_3-$ | $CH_3-$ | $CH_3-$ | $CH_3CH_2CH_2S-$ | 49/0.3 | 1.4617/24 | 50 | C | 62.0 | C | 61.7 |
|  |  |  |  |  |  |  |  | H | 10.4 | H | 10.3 |
| 7860 | $CH_3-$ | $CH_3-$ | $CH_3-$ | $C_2H_5S-$ | 58/2.1 | 1.4609/25 | 55 | — | | — | |
| 7900 | $CH_3-$ | H— | H— | $CH_3S-$ | 50/5 | — | — | C | 50.8 | C | 50.7 |
|  |  |  |  |  |  |  |  | H | 8.5 | H | 8.5 |
| 7909 | $CH_3CH_2CH_2-$ | $CH_3-$ | $CH_3-$ | $CH_3S-$ | 59/0.2 | — | — | C | 62.0 | C | 62.3 |
|  |  |  |  |  |  |  |  | H | 10.4 | H | 10.7 |
| 7965 | $CH_3-$ | $CH_3-$ | $CH_3-$ | $CH_3SCH_2-$ | 70/1.6 | 1.4623/24.5 | 30 | C | 59.9 | C | 60.1 |
|  |  |  |  |  |  |  |  | H | 10.1 | H | 10.0 |
| 8059 | $(CH_3)_3C-$ | H— | H— | Cl— | 63–5/10 | 1.4347/24.5 | 76 | C | 57.4 | C | 56.6 |
|  |  |  |  |  |  |  |  | H | 8.7 | H | 8.8 |
| 8126 | $-(CH_2)_5-$ |  | $CH_3-$ | $CH_3S-$ | 86–7/0.8 | 1.4954/24 | 29 | C | 64.5 | C | 64.0 |
|  |  |  |  |  |  |  |  | H | 9.6 | H | 9.6 |
| 8127 | $-(CH_2)_5-$ |  | H— | $CH_3S-$ | 88–9/0.6 | 1.4970/24 | 37 | C | 62.7 | C | 63.0 |
|  |  |  |  |  |  |  |  | H | 9.4 | H | 8.6 |
| 8373 | $-(CH_2)_2-$ |  | H— | $CH_3S-$ | 71–4/7.8 | 1.4980/22.5 | 71 | C | 55.4 | C | 55.6 |
|  |  |  |  |  |  |  |  | H | 7.7 | H | 7.9 |
| 8504 | $(CH_3)_3C-$ | H— | H— | $CH_3S-$ | 68/4.8 | 1.4600/22 | 66 | C | 59.9 | C | 59.0 |
|  |  |  |  |  |  |  |  | H | 10.0 | H | 9.8 |
| 9011 | $(CH_3)_2CH-$ | H— | H— | $CH_3S-$ | 81/9.3 | 1.4610/23 | 76 | (c) | | | |
| 9061 | $CH_3CH_2-$ | H— | H— | $CH_3S-$ | 72/7.8 | 1.4645/22 | 78 | C | 54.5 | C | 53.3 |
|  |  |  |  |  |  |  |  | H | 9.2 | H | 8.9 |
| 9274 | $CH_3-$ | $CH_3-$ | $CH_3-$ | (e) | (f) | — | — | C | 50.0 | C | 49.7 |
|  |  |  |  |  |  |  |  | H | 8.4 | H | 8.4 |
| 9275 | $CH_3-$ | $CH_3-$ | $CH_3-$ | $CH_3CH_2SCH_2CH_2S-$ | 110/0.3 | 1.5025/24 | 65 | C | 54.8 | C | 54.6 |
|  |  |  |  |  |  |  |  | H | 8.7 | H | 9.2 |
| 9278[d] | $CH_3-$ | $CH_3-$ | $CH_3-$ | $CH_3O-$ | 78/47 | 1.4136/23 | 57 | C | 64.5 | C | 64.3 |
|  |  |  |  |  |  |  |  | H | 10.8 | H | 10.8 |
| 9380 | $CH_3-$ | $CH_3-$ | $CH_3-$ | $CF_3CH_2CH_2S-$ | 60/0.08 | 1.4253/24 | 40 | C | 47.4 | C | 47.6 |
|  |  |  |  |  |  |  |  | H | 6.6 | H | 6.6 |
| 9382 | $CH_3-$ | $CH_3-$ | $CH_3-$ | $Cl_3CCH_2CH_2S-$ | 113/0.1 | 1.5055/24 | 39 | C | 40.0 | C | 40.2 |
|  |  |  |  |  |  |  |  | H | 5.4 | H | 5.5 |
| 9383 | $CH_3-$ | $CH_3-$ | $CH_3-$ | $C_6H_5CH_2CH_2S-$ | 128/0.06 | 1.5300/24 | 61 | C | 71.2 | C | 71.1 |
|  |  |  |  |  |  |  |  | H | 8.5 | H | 8.4 |
| 9385 | $CH_3-$ | $CH_3-$ | $CH_3-$ | $HC\equiv CCH_2S-$ | 72/0.08 | 1.5112/24 | 14 | C | 63.5 | C | 63.3 |
|  |  |  |  |  |  |  |  | H | 8.2 | H | 8.2 |

[a] J. Am. Chem. Soc., 77, 3272 (1955)
[b] Arkivi Kemi, 5, 533 (1953) and CA 48: 9321 (1954)
[c] Ann. 672, 156 (1964)
[d] J. Am. Chem. Soc., 72, 5161 (1950)
[e] $X_2 = (CH_3S-)_2$
[f] m. pt. = 50–51°

TABLE 3

OXIMES

| Compound Number | Chemical Name |
|---|---|
| 7252 | 3,3-dimethyl-1-methylthio-2-butanone oxime |
| 7470 | 1-carbomethoxymethylthio-3,3-dimethyl-2-butanone oxime |
| 7575 | 3-methyl-3-methylthio-2-butanone oxime |
| 7578 | 1-methylthio-2-propanone oxime |
| 7604 | 3,3-dimethyl-1-tert.-butylthio-2-butanone oxime |
| 7605 | 1-isopropylthio-3,3-dimethyl-2-butanone oxime |
| 7618 | 1-isobutylthio-3,3-dimethyl-2-butanone oxime |
| 7682 | 1-benzylthio-3,3-dimethyl-2-butanone oxime |
| 7711 | 3,3-dimethyl-1-phenylthio-2-butanone oxime |
| 7796 | 3,3-dimethyl-1-phenoxy-2-butanone oxime |
| 7820 | 1,3-bis(methylthio)-2-propanone oxime |
| 7858 | 1-hydroxy-3,3-dimethyl-2-butanone oxime |
| 7861 | 1-ethylthio-3,3-dimethyl-2-butanone oxime |
| 7896 | 3,3-dimethyl-1-n-propylthio-2-butanone oxime |
| 7898 | 1-allylthio-3,3-dimethyl-2-butanone oxime |
| 7917 | 1-methylthio-2-butanone oxime |
| 7925 | 3,3-dimethyl-1-methylthio-2-hexanone oxime |
| 7946 | 1,3-bis(methylthio)-3-methyl-2-butanone oxime |
| 8077 | 1-chloro-4,4-dimethyl-2-butanone oxime |
| 8109 | 4,4-dimethyl-1-methylthio-3-pentanone oxime |
| 8145 | methylthioacetylcyclohexane oxime |
| 8154 | 1-methyl-1-(methylthioacetyl)-cyclohexane oxime |
| 8358 | 1-chloro-3,3-dimethyl-2-butanone oxime |
| 8420 | methylthioacetylcyclopropane oxime |
| 8424 | 1,1-ethylenedithio-3,3-dimethyl-2-butanone oxime |
| 8507 | 4,4-dimethyl-1-methylthio-2-pentanone oxime |
| 8508 | 3,3-dimethyl-1-methylthio-2-pentanone oxime |
| 8872 | 3,3-dimethyl-1-methylsulfonyl-2-butanone oxime |
| 8873 | 3,3-dimethyl-1-methylsulfinyl-2-butanone oxime |
| 9059 | 1-methylthio-2-pentanone oxime |
| 9060 | 4-methyl-1-methylthio-2-pentanone oxime |
| 9301 | 1-methoxy-3,3-dimethyl-2-butanone oxime |
| 9302 | 1-ethoxy-3,3-dimethyl-2-butanone oxime |
| 9332 | 1-(2-ethylthioethylthio)-3,3-dimethyl-2-butanone oxime |
| 9381 | 1-(3,3,3-trifluoropropyl)-3,3-dimethyl-2-butanone oxime |
| 9384 | 3,3-dimethyl-1-(2-phenylethylthio)-2-butanone oxime |

TABLE 4

$$R_2-\underset{\underset{R_3}{|}}{\overset{\overset{R_1}{|}}{C}}-\overset{\overset{NOH}{\|}}{C}-CH_2X$$

| Compound Number | $R_1$ | $R_2$ | $R_3$ | X | Melting Point in °C | Percent Yield | Analysis Calculated | | Found | |
|---|---|---|---|---|---|---|---|---|---|---|
| 7252 | $CH_3-$ | $CH_3-$ | $CH_3-$ | $CH_3S-$ | (a) | 92 | — | | — | |
| 7470 | $CH_3-$ | $CH_3-$ | $CH_3-$ | $CH_3OCOCH_2S-$ | — | 87 | C | 49.3 | C | 49.4 |
|  |  |  |  |  |  |  | H | 7.7 | H | 7.7 |
|  |  |  |  |  |  |  | N | 6.4 | N | 6.2 |
| 7575 | $CH_3-$ | $CH_3-$ | $CH_3S-$ | $H-$ | 75–76 (b) | 81 | — | | — | |
| 7578 | $H-$ | $H-$ | $H-$ | $CH_3S-$ | (c) | 79 | C | 40.3 | C | 40.7 |
|  |  |  |  |  |  |  | H | 7.6 | H | 7.6 |
| 7604 | $CH_3-$ | $CH_3-$ | $CH_3-$ | $(CH_3)_3CS-$ | 120–121 | 75 | C | 59.1 | C | 59.1 |
|  |  |  |  |  |  |  | H | 10.4 | H | 10.4 |
| 7605 | $CH_3-$ | $CH_3-$ | $CH_3-$ | $(CH_3)_2CHS-$ | 51–52 | 63 | C | 57.1 | C | 56.5 |
|  |  |  |  |  |  |  | H | 10.1 | H | 9.5 |
| 7618 | $CH_3-$ | $CH_3-$ | $CH_3-$ | $(CH_3)_2CHCH_2S-$ | (d) | 38 | C | 59.1 | C | 59.2 |
|  |  |  |  |  |  |  | H | 10.4 | H | 10.5 |
| 7682 | $CH_3-$ | $CH_3-$ | $CH_3-$ | $C_6H_5CH_2S-$ | 84–87 | 100 | C | 65.8 | C | 65.6 |
|  |  |  |  |  |  |  | H | 8.1 | H | 9.2 |
| 7711 | $CH_3-$ | $CH_3-$ | $CH_3-$ | $C_6H_5S-$ | 83–84 | 29 | C | 64.5 | C | 64.1 |
|  |  |  |  |  |  |  | H | 7.7 | H | 8.0 |
| 7796 | $CH_3-$ | $CH_3-$ | $CH_3-$ | $C_6H_5O-$ | 104–105 | 83 | C | 69.5 | C | 70.1 |
|  |  |  |  |  |  |  | H | 8.3 | H | 8.3 |
|  |  |  |  |  |  |  | N | 6.8 | N | 6.9 |
| 7820 | $CH_3S-$ | $H-$ | $H-$ | $CH_3S-$ | (e) | 89 | C | 36.3 | C | 36.4 |
|  |  |  |  |  |  |  | H | 6.7 | H | 6.4 |
|  |  |  |  |  |  |  | N | 8.5 | N | 8.5 |
| 7858 (f) | $CH_3-$ | $CH_3-$ | $CH_3-$ | $HO-$ | 87–88 | 87 | — | | — | |
| 7861 | $CH_3-$ | $CH_3-$ | $CH_3-$ | $C_2H_5S-$ | 71–72 | 96 | N | 8.0 | N | 7.9 |
| 7896 | $CH_3-$ | $CH_3-$ | $CH_3-$ | $CH_3CH_2CH_2S-$ | (g) | 92 | N | 7.4 | N | 7.3 |
| 7898 | $CH_3-$ | $CH_3-$ | $CH_3-$ | $CH_2=CHCH_2S-$ | 57–58 | 56 | N | 7.5 | N | 7.3 |
| 7917 | $CH_3-$ | $H-$ | $H-$ | $CH_3S-$ | — | — | N | 10.5 | N | 10.4 |
| 7925 | $CH_3CH_2CH_2-$ | $CH_3-$ | $CH_3-$ | $CH_3S-$ | (h) | — | N | 7.4 | N | 7.4 |
| 7946 | $CH_3S-$ | $CH_3-$ | $CH_3-$ | $CH_3S-$ | 70–75 | 75 | C | 43.5 | C | 42.8 |
|  |  |  |  |  |  |  | N | 7.8 | N | 7.8 |
| 8077 | $(CH_3)_3C-$ | $H-$ | $H-$ | $Cl-$ | (i) | 38 | C | 51.4 | C | 50.7 |
|  |  |  |  |  |  |  | H | 8.6 | H | 8.4 |
|  |  |  |  |  |  |  | N | 8.6 | N | 8.1 |
| 8109 | $CH_3-$ | $CH_3-$ | $CH_3-$ | $CH_3SCH_2-$ | 84 | 73 | N | 8.0 | N | 8.1 |
| 8145 | $-(CH_2)_5-$ | | $H-$ | $CH_3S-$ | 64–4 | 64 | C | 57.7 | C | 57.5 |
|  |  |  |  |  |  |  | H | 9.2 | H | |
|  |  |  |  |  |  |  | N | 7.5 | N | |
| 8154 | $-(CH_2)_5-$ | | $CH_3-$ | $CH_3S-$ | (j) | 63 | C | 59.7 | C | 59.8 |
|  |  |  |  |  |  |  | H | 9.5 | H | |
|  |  |  |  |  |  |  | N | 7.0 | N | |
| 8358 | $CH_3-$ | $CH_3-$ | $CH_3-$ | $Cl-$ | 102–3 | 37 | C | 48.2 | C | 48.3 |
|  |  |  |  |  |  |  | H | 8.1 | H | 8.1 |
|  |  |  |  |  |  |  | N | 9.4 | N | 9.5 |
| 8420 | $-(CH_2)_2-$ | | $H-$ | $CH_3S-$ | (k) | 95 | N | 9.7 | N | 9.5 |
| 8424 | $CH_3-$ | $CH_3-$ | $CH_3-$ | (l) | 117 | 33 | N | 6.8 | N | 7.2 |
| 8507 | $(CH_3)_3C-$ | $H-$ | $H-$ | $CH_3S-$ | (m) | 50 | C | 54.8 | C | 54.6 |
|  |  |  |  |  |  |  | H | 9.8 | H | 9.8 |
| 8508 | $CH_3CH_2-$ | $CH_3-$ | $CH_3-$ | $CH_3S-$ | (n) | 50 | C | 54.8 | C | 54.4 |
|  |  |  |  |  |  |  | H | 9.8 | H | 9.7 |
| 8872 | $CH_3-$ | $CH_3-$ | $CH_3-$ | $CH_3SO_2-$ | 73–5 | 40 | N | 7.3 | N | 7.2 |
| 8873 | $CH_3-$ | $CH_3-$ | $CH_3-$ | $CH_3S(O)-$ | 104–6 | 35 | C | 47.4 | C | 47.3 |
|  |  |  |  |  |  |  | H | 8.5 | H | 8.3 |
|  |  |  |  |  |  |  | N | 7.9 | N | 7.9 |
| 9059 | $CH_3CH_2-$ | $H-$ | $H-$ | $CH_3S-$ | (o) | 72 | C | 49.0 | C | 49.0 |
|  |  |  |  |  |  |  | H | 8.9 | H | 8.9 |
|  |  |  |  |  |  |  | N | 9.5 | N | 9.3 |
| 9060 | $(CH_3)_2CH-$ | $H-$ | $H-$ | $CH_3S-$ | (p) | 93 | C | 52.1 | C | 51.5 |
|  |  |  |  |  |  |  | H | 9.4 | H | 9.4 |
|  |  |  |  |  |  |  | N | 8.7 | N | 8.2 |
| 9301 | $CH_3-$ | $CH_3-$ | $CH_3-$ | $CH_3O-$ | (q) | 45 | C | 57.9 | C | 57.6 |
|  |  |  |  |  |  |  | H | 10.4 | H | 9.9 |
| 9302 | $CH_3-$ | $CH_3-$ | $CH_3-$ | $CH_3CH_2O-$ | (r) | 74 | N | 8.8 | N | 8.6 |
| 9332 | $CH_3-$ | $CH_3-$ | $CH_3-$ | $CH_3CH_2SCH_2CH_2S-$ | 42–5 | 81 | C | 51.1 | C | 51.1 |
|  |  |  |  |  |  |  | H | 9.0 | H | 8.9 |
|  |  |  |  |  |  |  | N | 6.0 | N | 5.8 |
| 9381 | $CH_3-$ | $CH_3-$ | $CH_3-$ | $F_3CCH_2CH_2S-$ | 41–3 | 89 | C | 44.4 | C | 45.0 |
|  |  |  |  |  |  |  | H | 6.6 | H | 6.7 |
| 9384 | $CH_3-$ | $CH_3-$ | $CH_3-$ | $C_6H_5CH_2CH_2S-$ | 48–50 | 98 | C | 66.9 | C | 67.8 |
|  |  |  |  |  |  |  | H | 8.4 | H | 8.5 |

(a) $n_D^{25}$ 1.4965
(b) J. Agr. Food Chem., 14, 356 (1966)
(c) $n_D^{24}$ 1.5150
(d) b. 104°C/0.8 mm
(e) $n_D^{24}$ 1.5592
(f) Beilstein II 424
(g) $n_D^{24}$ 1.4879
(h) $n_D^{24}$ 1.4863
(i) b. 76–7°C/1.3 mm; $n_D^{24}$ 1.4672
(j) $n_D^{24}$ 1.5164
(k) $n_D^{23}$ 1.5340
(l) $X_2 = -SCH_2CH_2S-$
(m) $n_D^{23}$ 1.4884
(n) b. 95°C/0.7 mm; $n_D^{23}$ 1.4948
(o) $n_D^{24}$ 1.5010
(p) $n_D^{20}$ 1.4952
(q) $n_D^{24}$ 1.4460
(r) $n_D^{24}$ 1.4420

TABLE 5

| Compound Number | CARBAMATES Chemical Name |
|---|---|
| 7268 | 3,3-*dimethyl-2-methylcarbamyloximino-1-methylthiobutane* |
| 7472 | 2,2-*dimethyl-3-methylcarbamyloximinobutane* |
| 7503 | 1-*carbomethoxymethylthio-3,3-dimethyl-2-methylcarbamyloximinobutane* |
| 7577 | 3-*methyl-2-methylcarbamyloximino-3-methylthiobutane* |
| 7603 | 2-*methylcarbamyloximino-1-methylthiopropane* |
| 7619 | 3,3-*dimethyl-2-methylcarbamyloximino-1-tert.-butylthiobutane* |
| 7620 | 1-isopropylthio-3,3-dimethyl-2-methylcarbamyloximinobutane |
| 7639 | 1-isobutylthio-3,3-dimethyl-2-methylcarbamyloximinobutane |
| 7702 | 1-benzylthio-3,3-dimethyl-2-methylcarbamyloximinobutane |
| 7718 | 3,3-dimethyl-2-methylcarbamyloximino-1-phenylthiobutane |
| 7797 | 2-ethylcarbamyloximino-3,3-dimethyl-1-methylthiobutane |
| 7799 | 2-allylcarbamyloximino-3,3-dimethyl-1-methylthiobutane |
| 7803 | 3,3-dimethyl-2-methylcarbamyloximino-1-phenoxybutane |
| 7804 | 3,3-dimethyl-2-methylcarbamyloximino-1-methylsulfinylbutane |
| 7821 | 1-bromo-3,3-dimethyl-2-methylcarbamyloximinobutane |
| 7834 | 1,3-bis(methylthio)-2-methylcarbamyloximinopropane |
| 7859 | 2-carbamyloximino-3,3-dimethyl-1-methylthiobutane |
| 7862 | 1-ethylthio-3,3-dimethyl-2-methylcarbamyloximinobutane |
| 7867 | 3-methyl-2-methylcarbamyloximino-1-methylthiobutane |
| 7870 | 3,3-dimethyl-2-methylcarbamyloximino-1-(1-pyrrolidinyl)-butane |
| 7871 | 3,3-dimethyl-2-dimethylcarbamyloximino-1-methylthiobutane |
| 7895 | 3,3-dimethyl-2-methylcarbamyloximino-1-methylcarbamyloxybutane |
| 7897 | 1-allylthio-3,3-dimethyl-2-methylcarbamyloximinobutane |
| 7916 | 2-methylcarbamyloximino-1-methylthiobutane |
| 7929 | 3,3-dimethyl-2-methylcarbamyloximino-1-*n*-propylthiobutane |
| 7934 | 3,3-dimethyl-2-methylcarbamyloximino-1-methylthiohexane |
| 7960 | 1,3-bis(methylthio)-3-methyl-2-methylcarbamyloximinobutane |
| 7991 | 3,3-dimethyl-2-methylcarbamyloximino-1-thiocyanatobutane |
| 8018 | 1-cyclohexylthio-3,3-dimethyl-2-methylcarbamyloximinobutane |
| 8031 | 1-acetoxy-3,3-dimethyl-2-methylcarbamyloximinobutane |
| 8035 | 3,3-dimethyl-2-methylcarbamyloximino-1-(4'-methylphenylthio)-butane |
| 8036 | 1-(4'-*tert.*-butylphenylthio)-3,3-dimethyl-2-methylcarbamyloximinobutane |
| 8070 | 1-(4'-methoxyphenylthio)-3,3-dimethyl-2-methylcarbamyloximinobutane |
| 8071 | 2,2-dimethyl-3-methylcarbamyloximino-4-methylthiopentane |
| 8073 | 1-(4'-chlorophenylthio)-3,3-dimethyl-2-methylcarbamyloximinobutane |
| 8108 | 1-chloro-4,4-dimethyl-2-methylcarbamyloximinopentane |
| 8111 | 4,4-dimethyl-3-methylcarbamyloximino-1-methylthiopentane |
| 8169 | 1-cyclohexyl-1-methylcarbamyloximino-2-methylthioethane |
| 8179 | 1-(1-methylcyclohexyl)-1-methylcarbamyloximino-2-methylthioethane |
| 8327 | 1,3-bis(methylthio)-2-carbamyloximino-3-methylbutane |
| 8423 | 1,1-ethylenedithio-3,3-dimethyl-2-methylcarbamyloximinobutane |
| 8465 | 1-cyclopropyl-1-methylcarbamyloximino-2-methylthioethane |
| 8519 | 4,4-dimethyl-2-methylcarbamyloximino-1-methylthiopentane |
| 8520 | 3,3-dimethyl-2-methylcarbamyloximino-1-methylthiopentane |
| 8713 | 1-chloro-3,3-dimethyl-2-methylcarbamyloximinobutane |
| 8813 | 1-cyclopropyl-1-ethylcarbamyloximino-2-methylthioethane |
| 8814 | 1-allylcarbamyloximino-1-cyclopropyl-2-methylthioethane |
| 8868 | 3,3-dimethyl-2-methylcarbamyloximino-1-methylsulfonylbutane |
| 8997 | 1-azido-3,3-dimethyl-2-methylcarbamyloximinobutane |
| 9026 | 3,3-dimethyl-2-methylcarbamyloximino-1-(2-methylthioethylthio)-butane |
| 9057 | 2-methylcarbamyloximino-1-methylthiopentane |
| 9058 | 4-methyl-2-methylcarbamyloximino-1-methylthiopentane |
| 9071 | 2-allylcarbamyloximino-4-methyl-1-methylthiopentane |
| 9072 | 2-allycarbamyloximino-1-methylthiopentane |
| 9226 | 2-allylcarbamyloximino-3,3-dimethyl-1-(2-methylthioethylthio)-butane |
| 9300 | 1-methoxy-3,3-dimethyl-2-methylcarbamyloximinobutane |
| 9315 | 1-ethoxy-3,3-dimethyl-2-methylcarbamyloximinobutane |
| 9336 | 1-hydroxy-3,3-dimethyl-2-methylcarbamyloximinobutane |
| 9337 | 1-(2-ethylthioethylthio)-3,3-dimethyl-2-methylcarbamyloximinobutane |
| 9349 | 3,3-dimethyl-1-dimethylamino-2-methylcarbamyloximinobutane hydrochloride |
| 9350 | 3,3-dimethyl-2-methylcarbamyloximino-1-methylsulfonyloxybutane |
| 9386 | 1-(3,3,3-trifluoropropylthio)-3,3-dimethyl-2-methylcarbamyloximinobutane |
| 9387 | 2-ethylcarbamyloximino-1-(3,3,3-trifluoropropylthio)-3,3-dimethylbutane |
| 9388 | 2-allylcarbamyloximino-1-(3,3,3-trifluoropropylthio)-3,3-dimethylbutane |
| 9389 | 3,3-dimethyl-2-methylcarbamyloximino-1-(2-phenylethylthio)-butane |
| 9390 | 2-ethylcarbamyloximino-3,3-dimethyl-1-(2-phenylethylthio)-butane |
| 9391 | 2-allylcarbamyloximino-3,3-dimethyl-1-(2-phenylethylthio)-butane |
| 9392 | 3,3-dimethyl-1-dimethylamino-2-methylcarbamyloximinobutane |

TABLE 6

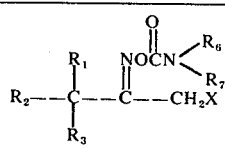

| Compound Number | $R_1$ | $R_2$ | $R_3$ | $R_6$ | $R_7$ | X | Method | Melting Point in °C (Refractive Index/°C) | Analysis Calculated | | Found | |
|---|---|---|---|---|---|---|---|---|---|---|---|---|
| 7268 | $CH_3$- | $CH_3$- | $CH_3$- | $CH_3$- | H- | $CH_3S$- | A | 50–52 | C | 49.5 | C | 49.3 |
| | | | | | | | | | H | 8.3 | H | 8.9 |
| | | | | | | | | | N | 13.0 | N | 12.9 |
| 7472[a] | $CH_3$- | $CH_3$- | $CH_3$- | $CH_3$- | H- | H- | A | 45–46 | C | 55.8 | C | 55.8 |
| | | | | | | | | | H | 9.4 | H | 9.1 |

TABLE 6-continued

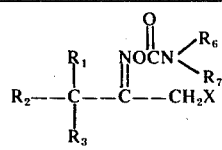

| Compound Number | $R_1$ | $R_2$ | $R_3$ | $R_6$ | $R_7$ | X | Method | Melting Point in °C (Refractive Index/°C) | Analysis Calculated | | Found |
|---|---|---|---|---|---|---|---|---|---|---|---|
| 7503 | $CH_3$- | $CH_3$- | $CH_3$- | $CH_3$- | H- | $H_3COCOCH_2S$- | A | (1.5016/23.5) | C | 47.8 | C 48.0 |
| | | | | | | | | | H | 7.3 | H 7.6 |
| 7577[a] | $CH_3$- | $CH_3$- | $CH_3S$- | $CH_3$- | H- | H- | A | 79 | — | | — |
| 7603 | H- | H- | H- | $CH_3$- | H- | $CH_3S$- | A | 47–50 | C | 40.9 | C 40.8 |
| | | | | | | | | | H | 6.9 | H 6.7 |
| 7619 | $CH_3$- | $CH_3$- | $CH_3$- | $CH_3$- | H- | $(CH_3)_3CS$- | A | 105–106 | C | 55.3 | C 55.1 |
| | | | | | | | | | H | 9.3 | H 9.3 |
| 7620 | $CH_3$- | $CH_3$- | $CH_3$- | $CH_3$- | H- | $(CH_3)_2CHS$- | A | 63–64 | C | 53.6 | C 53.6 |
| | | | | | | | | | H | 9.0 | H 8.5 |
| 7693 | $CH_3$- | $CH_3$- | $CH_3$- | $CH_3$- | H- | $(CH_3)_2CHCH_2S$- | A | 66–67 | C | 55.3 | C 55.2 |
| | | | | | | | | | H | 9.3 | H 9.5 |
| 7702 | $CH_3$- | $CH_3$- | $CH_3$- | H- | $C_6H_5CH_2S$- | | A | 54–56 | C | 1.2 | C 1.1 |
| | | | | | | | | | H | 7.5 | H 7.5 |
| 7718 | $CH_3$- | $CH_3$- | $CH_3$- | $CH_3$- | H- | $C_6H_5S$- | A | 106–107 | C | 60.0 | C 60.0 |
| | | | | | | | | | H | 7.2 | H 7.4 |
| 7797 | $CH_3$- | $CH_3$- | $CH_3$- | $CH_3CH_2$- | H- | $CH_3S$- | A | (1.4941/24) | C | 51.7 | C 51.1 |
| | | | | | | | | | H | 8.7 | H 8.5 |
| | | | | | | | | | N | 12.1 | N 11.6 |
| 7799 | $CH_3$- | $CH_3$- | $CH_3$- | $CH_2=CHCH_2$- | H- | $CH_3S$- | A | (1.5017/24) | C | 54.1 | C 53.5 |
| | | | | | | | | | H | 8.3 | H 8.0 |
| | | | | | | | | | N | 11.5 | N 11.2 |
| 7803 | $CH_3$- | $CH_3$- | $CH_3$- | $CH_3$- | H- | $C_6H_5O$- | A | 128–129 | C | 63.6 | C 63.7 |
| | | | | | | | | | H | 7.6 | H 7.7 |
| | | | | | | | | | N | 10.6 | N 10.7 |
| 7804 | $CH_3$- | $CH_3$- | $CH_3$- | $CH_3$- | H- | $CH_3S(O)$- | D | (1.5040/24) | C | 46.1 | C 45.2 |
| | | | | | | | | | H | 7.7 | H 7.5 |
| | | | | | | | | | N | 12.0 | N 11.9 |
| 7821 | $CH_3$- | $CH_3$- | $CH_3$- | $CH_3$- | H- | Br- | A | 83–84 | C | 38.3 | C 38.5 |
| | | | | | | | | | H | 6.0 | H 6.0 |
| | | | | | | | | | N | 11.2 | N 11.4 |
| 7834 | $CH_3S$- | H- | H- | $CH_3$- | H- | $CH_3S$- | A | 114–115 | C | 37.8 | C 37.8 |
| | | | | | | | | | H | 6.4 | H 6.2 |
| | | | | | | | | | N | 12.6 | N 12.7 |
| 7859 | $CH_3$- | $CH_3$- | $CH_3$- | H- | H- | $CH_3S$- | B | 58–60 | C | 47.0 | C 46.7 |
| | | | | | | | | | H | 7.9 | H 7.7 |
| | | | | | | | | | N | 13.7 | N 13.5 |
| 7862 | $CH_3$- | $CH_3$- | $CH_3$- | $CH_3$- | H- | $CH_3CH_2S$- | A | 45–47 | C | 51.7 | C 51.3 |
| | | | | | | | | | H | 8.7 | H 7.5 |
| | | | | | | | | | N | 12.2 | N 12.2 |
| 7867 | $CH_3$- | $CH_3$- | H- | $CH_3$- | H- | $CH_3S$- | A | (1.5015/24) | N | 13.7 | N 13.5 |
| 7870 | $CH_3$- | $CH_3$- | $CH_3$- | $CH_3$- | H- | $C_4H_8N$-[b] | C | 43–46 | N | 17.4 | N 17.0 |
| 7871 | $CH_3$- | $CH_3$- | $CH_3$- | $CH_3$- | $CH_3$ | $CH_3S$- | B | (1.4953/24) | C | 51.7 | C 51.6 |
| | | | | | | | | | H | 8.7 | H 8.5 |
| | | | | | | | | | N | 12.1 | N 11.8 |
| 7895 | $CH_3$- | $CH_3$- | $CH_3$- | $CH_3$- | H- | $CH_3NHCOO$- | A | (1.4796/24) | C | 49.0 | C 49.7 |
| | | | | | | | | | H | 7.8 | H 7.8 |
| 7897 | $CH_3$- | $CH_3$- | $CH_3$- | $CH_3$- | H- | $CH_2=CHCH_2S$- | A | (1.5075/25) | N | 11.5 | N 11.9 |
| 7916 | $CH_3$- | H- | H- | $CH_3$- | H- | $CH_3S$- | A | (1.5050/24) | C | 44.2 | C 44.4 |
| | | | | | | | | | H | 7.4 | H 8.0 |
| | | | | | | | | | N | 14.7 | N 15.0 |
| 7929 | $CH_3$- | $CH_3$- | $CH_3$- | $CH_3$- | H- | $CH_3CH_2CH_2S$- | A | 68–70 | C | 53.6 | C 53.2 |
| | | | | | | | | | H | 9.0 | H 9.1 |
| | | | | | | | | | N | 11.4 | N 11.4 |
| 7934 | $CH_3CH_2CH_2$- | $CH_3$- | $CH_3$- | $CH_3$- | H- | $CH_3S$- | A | (1.4937/24) | C | 53.8 | C 53.2 |
| | | | | | | | | | H | 9.0 | H 8.8 |
| | | | | | | | | | N | 11.4 | N 11.5 |
| 7960 | $CH_3S$- | $CH_3$- | $CH_3$- | $CH_3$- | H- | $CH_3S$- | A | (1.5339/24) | C | 43.2 | C 43.7 |
| | | | | | | | | | H | 7.2 | H 7.2 |
| | | | | | | | | | N | 11.2 | N 11.7 |
| 7991 | $CH_3$- | $CH_3$- | $CH_3$- | $CH_3$- | H- | NCS- | C | 85–86 | C | 47.1 | C 47.5 |
| | | | | | | | | | H | 6.6 | H 6.6 |
| | | | | | | | | | N | 18.3 | N 18.8 |
| 8018 | $CH_3$- | $CH_3$- | $CH_3$- | $CH_3$- | H- | $C_6H_{11}S$- | C | 105–106 | C | 58.7 | C 59.1 |
| | | | | | | | | | H | 9.2 | H 9.1 |
| | | | | | | | | | N | 9.8 | N 9.8 |
| 8031 | $CH_3$- | $CH_3$- | $CH_3$- | $CH_3$- | H- | $CH_3COO$- | C | 48–50 | C | 52.1 | C 51.8 |
| | | | | | | | | | H | 7.9 | H 7.8 |
| | | | | | | | | | N | 12.2 | N 12.4 |
| 8035 | $CH_3$- | $CH_3$- | $CH_3$- | $CH_3$- | H- | $4\text{-}CH_3C_6H_4S$- | C | 106–107 | C | 61.2 | C 60.8 |
| | | | | | | | | | H | 7.5 | H 7.6 |
| | | | | | | | | | N | 9.5 | N 9.1 |
| 8036 | $CH_3$- | $CH_3$- | $CH_3$- | $CH_3$- | H- | $4\text{-}(CH_3)_3CC_6H_4S$- | C | (1.5348/24) | C | 64.2 | C 64.7 |
| | | | | | | | | | H | 8.4 | H 8.4 |
| | | | | | | | | | N | 8.3 | N 8.4 |
| 8070 | $CH_3$- | $CH_3$- | $CH_3$- | $CH_3$- | H- | $4\text{-}CH_3OC_6H_4S$- | C | 90–92 | C | 58.0 | C 57.6 |
| | | | | | | | | | H | 7.2 | H 7.0 |
| | | | | | | | | | N | 9.0 | N 8.7 |
| 8071[c] | — | — | — | — | — | — | A | 93–94 | C | 51.7 | C 51.6 |
| | | | | | | | | | H | 8.7 | H 8.5 |
| | | | | | | | | | N | 12.1 | N 12.1 |

TABLE 6-continued

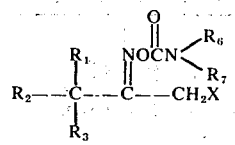

| Compound Number | $R_1$ | $R_2$ | $R_3$ | $R_6$ | $R_7$ | X | Method | Melting Point in °C (Refractive Index/°C) | Analysis Calculated | | Found |
|---|---|---|---|---|---|---|---|---|---|---|---|
| 8073 | $CH_3$- | $CH_3$- | $CH_3$- | $CH_3$- | H- | $4\text{-}ClC_6H_4S$- | C | 111–112 | C 53.4<br>H 6.1<br>N 8.9 | C<br>H<br>N | 53.0<br>6.1<br>8.9 |
| 8108 | $(CH_3)_3C$- | H- | H- | $CH_3$- | H- | $CH_3S$- | A | (1.4802/24) | N 12.7 | N | 12.8 |
| 8111 | $CH_3$- | $CH_3$- | $CH_3$- | $CH_3$- | H- | $CH_3SCH_2$- | A | 56–58 | C 51.7<br>H 8.7<br>N 12.1 | C<br>H<br>N | 51.6<br>8.5<br>12.5 |
| 8169 | -(CH$_2$)$_5$- | | H- | $CH_3$- | H- | $CH_3S$- | A | 70–71 | C 54.1<br>H 8.3<br>N 11.5 | C<br>H<br>N | 54.2<br>8.3<br>11.8 |
| 8179 | -(CH$_2$)$_5$- | | $CH_3$- | $CH_3$- | H- | $CH_3S$- | A | (1.5200/25) | C 55.8<br>H 8.6 | C<br>H | 55.7<br>8.6 |
| 8327 | $CH_3S$- | $CH_3$- | $CH_3$- | H- | H- | $CH_3S$- | B | — | C 41.2<br>H 6.9<br>N 12.0 | C<br>H<br>N | 41.4<br>6.8<br>12.1 |
| 8423 | $CH_3$- | $CH_3$- | $CH_3$- | $CH_3$- | H- | (d) | A | 83–86 | C 45.8<br>H 6.9<br>N 13.9 | C<br>H<br>N | 45.6<br>6.9<br>14.3 |
| 8465 | -(CH$_2$)$_2$- | | H- | $CH_3$- | H- | $CH_3S$- | A | (1.5297/23) | | | |
| 8519 | $(CH_3)_3C$- | H- | H- | $CH_3$- | H- | $CH_3S$- | A | (1.49620/23) | C 51.7<br>h 8.7 | C<br>H | 51.3<br>8.5 |
| 8520 | $CH_3CH_2O$- | $CH_3$- | $CH_3$- | $CH_3$- | H- | $CH_3S$- | A | (1.5030/23) | C 51.7<br>H 8.7 | C<br>H | 51.4<br>8.5 |
| 8713 | $CH_3$- | $CH_3$- | $CH_3$- | $CH_3$- | H- | Cl- | A | 77–78 | N 13.6 | N | 13.8 |
| 8813 | -(CH$_2$)$_2$- | | H- | $CH_3CH_2$- | H- | $CH_3S$- | A | (1.5205/24) | C 50.0<br>H 7.5 | C<br>H | 49.8<br>7.5 |
| 8814 | -(CH$_2$)$_2$- | | H- | $CH_2=CHCH_2$- | H- | $CH_3S$- | A | (1.5296/24) | N 12.3 | N | 12.2 |
| 8868 | $CH_3$- | $CH_3$- | $CH_3$- | $CH_3$- | H- | $CH_3SO_2$- | A | (1.4923/22) | N 11.2 | N | 11.1 |
| 8997 | $CH_3$- | $CH_3$- | $CH_3$- | $CH_3$- | H- | $N_3$- | C | 67–68 | C 45.1<br>H 7.1 | C<br>H | 45.7<br>7.2 |
| 9026 | $CH_3$- | $CH_3$- | $CH_3$- | $CH_3$- | H- | $CH_3SCH_2CH_2S$- | C | 51–56 | C 47.5<br>H 8.0 | C<br>H | 47.5<br>8.0 |
| 9057 | $CH_3CH_2$- | H- | H- | $CH_3$- | H- | $CH_3S$- | A | (1.5030/24) | C 47.0<br>H 7.9<br>N 13.7 | C<br>H<br>N | 46.8<br>7.9<br>13.9 |
| 9058 | $(CH_3)_2CH$- | H- | H- | $CH_3$- | H- | $CH_3S$- | A | (1.5005/24) | C 49.5<br>H 8.3<br>N 12.8 | C<br>H<br>N | 49.4<br>8.4<br>12.7 |
| 9071 | $(CH_3)_2CH$- | H- | H- | $CH_2=CHCH_2$- | H- | $CH_3S$- | A | (1.5035/23) | C 54.1<br>H 8.3<br>N 11.5 | C<br>H<br>N | 54.1<br>8.3<br>11.3 |
| 9072 | $CH_3CH_2$- | H- | H- | $CH_2=CHCH_2$- | H- | $CH_3S$- | A | (1.5070/23) | N 12.2 | N | 12.3 |
| 9226 | $CH_3$- | $CH_3$- | $CH_3$- | $CH_2=CHCH_2$- | H- | $CH_3SCH_2CH_2S$- | A | (1.5285/24) | C 51.4<br>H 7.9<br>N 9.2 | C<br>H<br>N | 51.4<br>7.8<br>9.4 |
| 9300 | $CH_3$- | $CH_3$- | $CH_3$- | $CH_3$- | H- | $CH_3O$- | A | (1.4650/24) | C 53.4<br>H 9.0 | C<br>H | 52.8<br>9.0 |
| 9315 | $CH_3$- | $CH_3$- | $CH_3$- | $CH_3$- | H- | $CH_3CH_2O$- | A | (1.4649/24) | N 13.0 | N | 13.4 |
| 9336 | $CH_3$- | $CH_3$- | $CH_3$- | H- | HO- | A | (1.4830/-23) | C 1.1<br>H 8.5<br>N 14.9 | C<br>H<br>N | 1.4<br>8.6<br>15.2 |
| 9337 | $CH_3$- | $CH_3$- | $CH_3$- | $CH_3$- | H- | $CH_3CH_2SCH_2CH_2S$- | A | (1.5261/23) | C 49.3<br>H 8.3 | C<br>H | 49.8<br>8.3 |
| 9349 | $CH_3$- | $CH_3$- | $CH_3$- | $CH_3$- | H- | $(CH_3)_2N$-(e) | C | 137–138 | C 47.7<br>H 8.8<br>N 16.7 | C<br>H<br>N | 47.7<br>8.8<br>16.7 |
| 9350 | $CH_3$- | $CH_3$- | $CH_3$- | $CH_3$- | H- | $CH_3SO_3$- | E | (1.4810/25) | C 40.6<br>H 6.8<br>N 10.5 | C<br>H<br>N | 41.2<br>6.8<br>10.5 |
| 9386 | $CH_3$- | $CH_3$- | $CH_3$- | $CH_3$- | H- | $F_3CCH_2CH_2S$- | A | 64–66 | C 44.0<br>H 6.3 | C<br>H | 44.2<br>6.5 |
| 9387 | $CH_3$- | $CH_3$- | $CH_3$- | $CH_3CH_2$- | H- | $F_3CCH_2CH_2S$- | A | (1.4623/24) | C 45.9<br>H 6.7<br>N 8.9 | C<br>H<br>N | 46.7<br>6.9<br>9.0 |
| 9388 | $CH_3$- | $CH_3$- | $CH_3$- | $CH_2=CHCH_2$- | H- | $F_3CCH_2CH_2S$- | A | (1.4717/24) | C 47.9<br>H 6.4<br>N 8.6 | C<br>H<br>N | 48.7<br>6.6<br>9.1 |
| 9389 | $CH_3$- | $CH_3$- | $CH_3$- | $CH_3$- | H- | $C_6H_5CH_2CH_2S$- | A | (1.5405/24) | C 62.3<br>H 8.0 | C<br>H | 62.8<br>7.8 |
| 9390 | $CH_3$- | $CH_3$- | $CH_3$- | $CH_3CH_2$- | H- | $C_6H_5CH_2CH_2S$- | A | (1.5348/24) | C 63.4<br>H 8.1 | C<br>H | 63.6<br>8.1 |
| 9391 | $CH_3$- | $CH_3$- | $CH_3$- | $CH_2=CHCH_2$- | H- | $C_6H_5CH_2CH_2S$- | A | (1.4253/24) | C 64.7<br>H 7.8 | C<br>H | 65.5<br>8.1 |
| 9392 | $CH_3$- | $CH_3$- | $CH_3$- | $CH_3$- | H- | $(CH_3)_2N$- | C | 42–43 | N 19.5 | N | 19.3 |

*Method: A = Example 3
B = Example 4
C = Example 5
D = Example 8
E = Example 14A (a) J. Agr. Food Chem., 14, 356 (1966)
(b) 1-pyrrolidinyl
(c) Example 9
(d) $X_2 = -SCH_2CH_2S$-
(e) hydrochloride salt The compounds are evaluated for biological activity against the following representative pests: Mexican bean beetle (*Epilachna varivestis*), Southern army worm (*Prodenia eridania*), housefly (*Musca domestica*), bean aphid (*Aphis fabae*), and red spider mite (*Tetranychus sp.*). The last two pests are treated both by contact and systemic application.

For purposes of comparison, results obtained with known Compound 7472, Compound 7577, and aldicarb are included in the test results. Each test compound is rated using the following scale:

| Rating Number | Contact Activity = ≥ 50% mortality at concentration in parts per million of | Rating Number | Systemic Activity = ≥ 50% mortality at concentration in pounds per acre of |
|---|---|---|---|
| 0 | >500 | 0 | >16 |
| 1 | 500–250 | 1 | 16–8 |
| 2 | 250–128 | 2 | 8–4 |
| 3 | 128–64 | 3 | 4–2 |
| 4 | 64–32 | 4 | 2–1 |
| 5 | 32–16 | 5 | 1–1/2 |
| 6 | 16–8 | 6 | 1/2–1/4 |
| 7 | 8–4 | 7 | 1/4–1/8 |
| 8 | 4–2 | 8 | 1/8–1/16 |
| 9 | ≤ 2 | 9 | ≤ 1/16 |

The tests employed are:

EXAMPLE 15

Bean Aphid Spray and Systemic Test

This test determines the insecticidal activity of the compound being tested against the bean aphid *Aphis fabae*. Stock formulations containing 500 ppm of each test chemical are prepared using 0.05 g of the test chemical (or 0.05 ml if a liquid), 4.0 ml acetone containing 0.25% (V/V) Triton X-155, and 9.60 ml deionized water and are used in both soil drench and spray treatments. The stock formulations are diluted to obtain the appropriate lower concentrations maintaining the concentration level of all adjuvants. The bean aphid is cultured on nasturtium plants (var. Tall Single), no attempt being made to select insects of a given age in these tests. Single nasturtium test plants growing in soil in individual 2¼ inch fiber pots are then infested with populations of 100 to 200 aphids.

In the spray application, 50 ml of stock or diluted formulation is uniformly sprayed onto the plants. In the systemic application, 11.2 ml of stock or diluted formulation is applied to the soil containing the plant. A dosage of 11.2 ml of formulation containing 500 ppm of test chemical is equivalent to a dosage of the test chemical of 16 pounds per acre.

The plant test units under fluorescent lights are given bottom watering for the duration of the test. Percentage mortality is determined three days after treatment. Results of this test are shown in Table 7 as A (aphid contact spray) and AS (aphid systemic soil drench).

EXAMPLE 16

Red Spider Mite Spray and Systemic Test

This test determines te acaricidal activity of the compound being tested against the red spider mite, *Tetranychus sp.* Stock formulations containing 500 ppm of each test chemical are prepared by the procedure described in Example 15 and are used in both the soil drench and spray treatments. The stock culture of mites is maintained on Scarlet runner bean foliage. Approximately 18 to 24 hours before testing, mites are transferred to the primary leaves of two Lima bean plants (var. Sieva) grown in 2¼ inch pots.

The spray and systemic application methods described in Example 15 are used to apply the test formulations to the infested plants and soil. After three days, two of the four leaves treated are examined and mortality is determined. Should a compound be an effective miticide, the other two leaves are available to obtain information on the residual activity of the formulation. Results of this test are shown in Table 7 as M (mite contact spray test) and MS (mite systemic soil drench test).

EXAMPLE 17

Housefly Spray Test

This test determines the insecticidal activity of the compound being tested against adult houseflies, *Musca domestica*. Stock formulations containing 500 ppm of each test chemical are prepared using the procedure described in Example 15 and are diluted to obtain the appropriate lower concentrations.

Ten adult flies are placed in a cylindrical screen cage 1½ by 4 inches fabricated from 20-mesh stainless steel screening and are sprayed with 50 ml of the stock or diluted formulation. The flies are supplied food and drink from a dextrose solution by draping a paper wick over the outside of the screen cylinder and are able to feed and drink ad libitum. Percent mortality obtained is determined three days after treatment. Results of this test are shown in Table 7 as HF (housefly spray test).

EXAMPLE 18

Southern Army Worm Spray Test

Paired fully expanded primary leaves excised from Scarlet runner bean plants are maintained in plastic tubes containing water and sprayed with the test formulation prepared as described in Example 15. After the spray deposit on the leaves is dry, the paired leaves are separated. One leaf is placed onto 1.5 percent water agar and infested with 10 newly hatched Southern army worm larvae. The covered test receptacle is held at 72°

F for three days and then the percent mortality is determined. Results of this test are shown in Table 7 as AW (Southern army worm spray test).

EXAMPLE 19

Mexican Bean Beetle Leaf Spray Test

This test determines the insecticidal activity of the compound being tested against the Mexican bean beetle (*Epilachna varivestis*). The test procedure is the same as that described for the Southern army worm in Example 18 with the exception that one-day oil larvae of the Mexican bean beetle instead of newly hatched Southern army worm larvae are used.

These tests are held at 72° F for three days when mortality and feeding inhibition are determined. The feeding inhibition is an indication of the repellent properties of the test material. Results of this test are shown in Table 7 and BB (Mexican bean beetle leaf spray test).

TABLE 7

| Compound Number | BB[1] | AW[2] | HF[3] | M[4] | A[5] | MS[6] | AS[7] |
|---|---|---|---|---|---|---|---|
| 7268 | 5 | 0 | 1 | 7 | 9 | 5 | 7 |
| 7472 | 0 | 0 | 0 | 0 | 1 | 0 | 1 |
| 7503 | 3 | 0 | 0 | 1 | 6 | 1 | 0 |
| 7577 | 0 | 0 | 0 | 0 | 0 | 0 | 0 |
| 7603 | 0 | 0 | 5 | 0 | 4 | 0 | 3 |
| 7718 | 5 | 0 | 1 | 0 | 2 | 0 | 1 |
| 7797 | 2 | 0 | 3 | 3 | 6 | 3 | 4 |
| 7799 | 5 | 0 | 2 | 2 | 5 | 2 | 0 |
| 7804 | 6 | 2 | 2 | 5 | 8 | 5 | 7 |
| 7859 | 4 | 0 | 0 | 5 | 7 | 3 | 4 |
| 7862 | 2 | 0 | 3 | 3 | 6 | 1 | 4 |
| 7867 | 2 | 0 | 3 | 1 | 6 | 1 | 4 |
| 7871 | 0 | 0 | 0 | 1 | 5 | 1 | 5 |
| 7897 | 4 | 0 | 3 | 4 | 4 | 1 | 3 |
| 7916 | 0 | 0 | 3 | 0 | 5 | 0 | 3 |
| 7934 | 5 | 0 | 0 | 6 | 6 | 2 | 2 |
| 7960 | 4 | 0 | 0 | 5 | 5 | 0 | 0 |
| 7991 | 5 | 0 | 0 | 0 | 2 | 0 | 0 |
| 8071 | 1 | 0 | 0 | 0 | 4 | 0 | 4 |
| 8111 | 0 | 0 | 1 | 3 | 3 | 0 | 0 |
| 8465 | 4 | 1 | 2 | 2 | 5 | 0 | 4 |
| 8519 | 0 | 0 | 0 | 2 | 5 | — | — |
| 8520 | 5 | 0 | 0 | 6 | 8 | 5 | 4 |
| 8868 | 7 | 0 | 2 | 6 | 8 | 6 | 7 |
| 8997 | 7 | 2 | 2 | 3 | 7 | 3 | 6 |
| 9026 | 6 | 0 | 0 | 4 | 4 | 0 | 0 |
| 9057 | 0 | 0 | 1 | 0 | 7 | 0 | 4 |
| 9058 | 0 | 0 | 1 | 2 | 7 | 0 | 6 |
| aldicarb | 4 | 0 | 7 | 4 | 9 | 5 | 9 |

[1]BB = Mexican bean beetle
[2]AW = Southern army worm
[3]HF = housefly
[4]M = mite contact
[5]A = aphid contact
[6]MS = mite systemic
[7]AS = aphid systemic It is to be noted that Compound 7268 exhibits outstanding activity against all of the pests except the Southern army worm and the housefly. This activity is comparable or superior to that of the commercial material, aldicarb (Formula III), and vastly superior to that of Compound 7472 (Formula I), the unsubstituted 3,3-dimethyl-2-butanone derivative, or Compound 7577 (Formula II), the ketoxime analog of aldicarb.

The high insecticidal and miticidal activity of Compound 7268 is further demonstrated by the results of special tests described below.

EXAMPLE 20

Systemic Test of Compound 7268 Against Lygus Bug and Spotted Cucumber Beetle The techniques used are essentially the same for the systemic tests described above in Example 15. The test compound is Compound 7268. There is one Sieva bean plant per pot and five adult insects are caged on each plant. One plant is used for each test species. The checks showed no mortality during the tests.

| Dosage, lb/A | % Mortality Lygus Bug | | | Spotted Cucumber Beetle | | |
|---|---|---|---|---|---|---|
| | 3 days | 4 days | 6 days | 3 days | 4 days | 6 days |
| 2 | 100 | 100 | 100 | 60 | 100 | 100 |
| 1 | 80 | 80 | 100 | 30 | 100 | 100 |
| 0.5 | 0 | 60 | 80 | 20 | 40 | 80 |

EXAMPLE 21

Activity of Compound 7268 Against Southern Corn Rootworm

The test organism is a strain of Southern corn rootworm (*Diabrotica undecimpunctata howardi*) resistant to chlorinated hydrocarbon insecticides and the test compound is Compound 7268. Duplicate samples of sand-soil mixtures are treated with appropriate volumes of test formulation to give the desired dosages. The sand-soil samples are in covered paper cups, and several hours after drenching, all cups are given a thorough shaking to provide complete and uniform mixing of the chemical throughout the soil. One day after treatment, two corn seedlings and five rootworms are placed into each cup and the lids replaced. Five days later, mortality is determined. The results are given below:

| Dosage, lb/6" A | 2.5 | 1.25 | 1 |
|---|---|---|---|
| % Mortality | 100 | 100 | 90 |

EXAMPLE 22

Systemic Activity of Compound 7268 Against Melon Aphid

The techniques used are essentially the same as for the systemic tests described above in Example 15. The test plants are cucumber seedlings; the test compound is Compound 7268; and the pest is the melon aphid (*Aphis gosyppi*).

| Dosage, lb/A | 0.5 | 0.25 | 0.125 | 0.062 |
|---|---|---|---|---|
| % Control | 100 | 100 | 100 | 100 |

EXAMPLE 23

Residual Systemic Activity of Compound 7268 Against Mexican Bean Beetle Larvae Three furrows are opened in soil contained in 8 × 10 × 3 inch fiber pans and 12 Pinto bean seeds are evenly distributed in each furrow. The test compound is Compound 7268. Appropriate volumes of test formulation to give the desired dosages are applied over the seeds in the open furrows, and the furrows are immediately closed. At the indicated weekly intervals, one leaf is harvested from each row, placed onto water agar in a plastic Petri dish, and infested with 10 one-day-old bean beetle larvae. Mortality is determined three days later.

| Weeks After Treatment | % Mortality at Indicated Dosage, lb/A | | | |
|---|---|---|---|---|
| | 1 | 0.5 | 0.25 | Check |
| 3 | 100 | 100 | 100 | 0 |
| 7 | 100 | 100 | 100 | 10 |
| 10 | 95 | 100 | 100 | 0 |
| 11 | 95 | 70 | 95 | 0 |

EXAMPLE 24

Root-knot Nematocide Test

This test is an evaluation of the effectiveness of the compound being tested against infection by root-knot nematodes (*Meloidogyne spp.*).

Composted greenhouse soil, diluted by one-third with clean washed sand, is infected with about two grams of knotted or galled tomato roots per pot. Treatment is accomplished by applying 25 ml of the formulated compound onto the infested soil. The formulation contains 0.056 g of Compound 7960, 1.0 ml stock emulsifier solution (0.25% Triton X-155 in acetone by volume), and 24.0 ml deionized water, giving a concentration of 2240 ppm. Lower concentrations are achieved by dilution.

After treatment with the test formulation, the soil, inoculum, and formulation are thoroughly mixed, returned to the pot, and the mixture incubated for seven days at 20° C and constant moisture. After incubation, two seedlings of Rutgers tomato transplants and three garden nasturtium (*Nasturtium spp.*) seeds are set in each pot. Roots are removed from the soil after three weeks of growth and rated for gall (root-knot nematode infection) formation. Nasturtium roots are evaluated only when necrosis of the tomato host has occurred. A rating of infection from 0 to 10 is recorded: 0° no galls or complete control, and 10° heavily galled roots comparable to controls. Each of the root systems is rated separately and the average is multiplied by 10 and subtracted from 100 to give percent nematode control. Results of the tests are shown below:

| Compound Number | Percent Control at Indicated Dosage, lb/A | | | | |
|---|---|---|---|---|---|
| | 8 | 4 | 2 | 1 | 0.5 |
| 7960 | 100 | 100 | 100 | 100 | 97 |
| 8423 | 100 | 90 | 60 | — | — |
| 8997 | 100 | 100 | 0 | — | — |
| 9026 | 90 | 70 | 60 | 30 | — |

It is to be understood that although the invention has been described with specific reference to particular embodiments thereof, it is not to be so limited, since changes and alterations therein may be made which are within the full intended scope of this invention as defined by the appended claims.

What is claimed is:

1. A composition of matter having the structural formula:

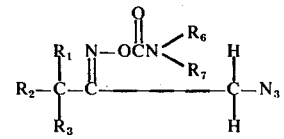

where:
a. $R_1$ is $R_2$–$R_3$ or H;
b. $R_2$–$R_3$ is lower alkyl, lower alkenyl, lower alkynl, substituted lower alkyl, alkenyl, or alkynyl, with the proviso that $R_2$ and $R_3$ may be connected to form a cycloalkyl ring of not more than 6 carbon atoms;
c. $R_6$–$R_7$ is hydrogen, lower alkyl, lower alkenyl, or lower alkynyl.

2. The composition of matter of claim 1 wherein the composition is 1-azido-3,3-dimethyl-2-methylcarbamyloximinobutane.

* * * * *